US008579325B2

(12) United States Patent
Roychoudhury

(10) Patent No.: US 8,579,325 B2
(45) Date of Patent: Nov. 12, 2013

(54) ACTIVE BOLSTER

(75) Inventor: Raj S. Roychoudhury, Bloomfield Hills, MI (US)

(73) Assignee: Salflex Polymers Ltd., Weston, Ontario (CA)

(*) Notice: Subject to any disclaimer, the term of this patent is extended or adjusted under 35 U.S.C. 154(b) by 56 days.

(21) Appl. No.: 13/215,892

(22) Filed: Aug. 23, 2011

(65) Prior Publication Data
US 2012/0112439 A1    May 10, 2012

Related U.S. Application Data

(60) Provisional application No. 61/411,788, filed on Nov. 9, 2010.

(51) Int. Cl.
*B60R 21/045* (2006.01)
(52) U.S. Cl.
USPC ......................................................... 280/752
(58) Field of Classification Search
USPC ................ 280/730.1, 730.2, 743.1, 751–753
See application file for complete search history.

(56) References Cited

U.S. PATENT DOCUMENTS

| | | | |
|---|---|---|---|
| 2,834,606 A | 5/1958 | Bertrand |
| 3,185,497 A | 5/1965 | Lagace |
| 3,473,824 A | 10/1969 | Carey |
| 3,963,362 A | 6/1976 | Hollis |
| 3,981,518 A | 9/1976 | Pulling |
| 4,203,616 A | 5/1980 | Okada |
| 4,297,051 A | 10/1981 | Robinson |
| 4,362,425 A | 12/1982 | Dixon |
| 4,511,281 A | 4/1985 | Schmanski |
| 4,518,172 A | 5/1985 | Bortz |
| 4,597,691 A | 7/1986 | Clarke |
| 4,721,329 A | 1/1988 | Brantman |
| 4,951,963 A | 8/1990 | Behr |
| 5,082,310 A | 1/1992 | Bauer |
| 5,138,721 A | 8/1992 | Spector |
| 5,273,309 A | 12/1993 | Lau |

(Continued)

FOREIGN PATENT DOCUMENTS

| | | |
|---|---|---|
| AT | 404746 | 2/1999 |
| DE | 1112266 | 8/1961 |

(Continued)

OTHER PUBLICATIONS

Written Opinion and International Search Report for related International Application No. PCT/US2011/049177, report dated Apr. 12, 2012.

*Primary Examiner* — Joseph Rocca
*Assistant Examiner* — Robert A Coker
(74) *Attorney, Agent, or Firm* — Miller, Matthias & Hull LLP

(57) ABSTRACT

Provided is an active bolster for a vehicle occupant, the active bolster comprising a rear panel, an internal structure, and a front panel. The internal structure is disposed between the rear panel and the front panel, and the internal structure and rear panel together forming a hollow chamber in communication with an inflation device. The hollow chamber is expandable on activation of the inflation device. The internal structure has at least one expandable element such that upon pressurization of the hollow chamber by the inflation device, at least a portion of the at least one expandable element undergoes deformation to permit inflation of the hollow chamber, thereby displacing the rear panel rearwardly to an extended position.

13 Claims, 27 Drawing Sheets

(56) References Cited

U.S. PATENT DOCUMENTS

| | | | |
|---|---|---|---|
| 5,312,133 A | 5/1994 | Pietila | |
| 5,324,070 A | 6/1994 | Kitagawa | |
| 5,324,072 A | 6/1994 | Olson | |
| 5,364,125 A | 11/1994 | Brown | |
| 5,370,417 A | 12/1994 | Kelman | |
| 5,382,051 A | 1/1995 | Glance | |
| 5,447,326 A | 9/1995 | Laske | |
| 5,456,490 A | 10/1995 | Carter | |
| 5,476,283 A | 12/1995 | Elton | |
| 5,498,026 A | 3/1996 | Eckhout | |
| 5,524,924 A | 6/1996 | Steffens, Jr. | |
| 5,533,748 A | 7/1996 | Wirt | |
| 5,536,043 A | 7/1996 | Lang | |
| 5,544,913 A | 8/1996 | Yamanishi | |
| 5,556,128 A | 9/1996 | Sinnhuber | |
| 5,567,375 A | 10/1996 | Filion | |
| 5,615,914 A | 4/1997 | Galbraith | |
| 5,630,621 A * | 5/1997 | Schneider | 280/730.1 |
| 5,716,093 A | 2/1998 | Sadr | |
| 5,718,449 A | 2/1998 | Numazawa | |
| 5,775,729 A * | 7/1998 | Schneider et al. | 280/730.1 |
| 5,816,613 A | 10/1998 | Specht | |
| 5,845,937 A | 12/1998 | Smith | |
| 5,865,468 A | 2/1999 | Hur | |
| 5,927,755 A | 7/1999 | Matsuo | |
| D412,880 S | 8/1999 | Sadr | |
| 5,931,493 A * | 8/1999 | Sutherland | 280/753 |
| 5,957,493 A | 9/1999 | Larsen | |
| 5,967,594 A | 10/1999 | Ramanujam | |
| 5,968,431 A | 10/1999 | Ang | |
| 6,032,978 A | 3/2000 | Spencer | |
| 6,131,950 A | 10/2000 | Schroter | |
| 6,142,520 A | 11/2000 | Iino | |
| 6,158,766 A | 12/2000 | Kowalski | |
| 6,170,871 B1 | 1/2001 | Goestenkors | |
| 6,193,272 B1 | 2/2001 | Aigner | |
| 6,203,057 B1 | 3/2001 | Spencer et al. | |
| 6,213,497 B1 | 4/2001 | Spencer | |
| 6,231,072 B1 | 5/2001 | Pywell | |
| 6,250,665 B1 | 6/2001 | Sutherland | |
| 6,302,437 B1 * | 10/2001 | Marriott et al. | 280/732 |
| 6,305,710 B1 | 10/2001 | Bosgieter | |
| 6,336,653 B1 | 1/2002 | Yaniv | |
| 6,338,501 B1 | 1/2002 | Heilig | |
| 6,416,079 B1 * | 7/2002 | Lutz et al. | 280/730.1 |
| 6,435,554 B1 | 8/2002 | Feldman | |
| 6,471,242 B2 | 10/2002 | Schneider | |
| 6,517,103 B1 * | 2/2003 | Schneider | 280/730.1 |
| 6,536,802 B1 | 3/2003 | Sutherland | |
| 6,543,838 B1 | 4/2003 | Bertolini | |
| 6,568,743 B1 | 5/2003 | Jayasuriya | |
| 6,578,867 B2 | 6/2003 | Khoudari | |
| 6,588,557 B2 | 7/2003 | Williams | |
| 6,619,689 B2 | 9/2003 | Spencer | |
| 6,688,643 B2 | 2/2004 | Schneider | |
| 6,712,385 B2 | 3/2004 | Enders | |
| 6,715,789 B2 | 4/2004 | Takimoto et al. | |
| 6,752,417 B2 * | 6/2004 | Takimoto et al. | 280/730.1 |
| 6,758,493 B2 | 7/2004 | Conlee et al. | |
| 6,817,625 B2 | 11/2004 | Hjerpe | |
| 6,817,627 B2 * | 11/2004 | Galmiche et al. | 280/730.1 |
| 6,848,715 B2 | 2/2005 | Nelson | |
| 6,874,811 B2 * | 4/2005 | Enders et al. | 280/730.1 |
| 6,971,667 B2 | 12/2005 | Enders | |
| 6,976,706 B2 | 12/2005 | Smith | |
| 6,991,252 B2 | 1/2006 | Enders | |
| 7,021,652 B2 | 4/2006 | Kumagai | |
| 7,055,083 B2 | 5/2006 | Wang | |
| 7,055,853 B2 | 6/2006 | Honda | |
| 7,086,663 B2 | 8/2006 | Honda | |
| 7,093,846 B2 | 8/2006 | Reiter | |
| 7,093,851 B2 | 8/2006 | Lotspih | |
| 7,144,032 B2 | 12/2006 | Lunt | |
| 7,168,733 B2 | 1/2007 | Kumagai | |
| 7,213,840 B2 | 5/2007 | Kumagai | |
| 7,249,781 B2 * | 7/2007 | Kai et al. | 280/728.3 |
| 7,322,598 B2 * | 1/2008 | Galmiche et al. | 280/730.1 |
| 7,350,852 B2 | 4/2008 | Rust | |
| 7,367,587 B2 | 5/2008 | Taoka | |
| 7,393,013 B2 | 7/2008 | Best | |
| 7,396,040 B2 | 7/2008 | Enders | |
| 7,413,215 B2 | 8/2008 | Weston | |
| 7,422,234 B2 | 9/2008 | Huber | |
| 7,448,645 B2 | 11/2008 | Bederka | |
| 7,481,457 B2 | 1/2009 | Best | |
| 7,568,722 B2 | 8/2009 | Sato | |
| 7,578,518 B2 | 8/2009 | Ochiai | |
| 7,735,865 B2 | 6/2010 | Cappabianca et al. | |
| 7,874,587 B2 | 1/2011 | Miki | |
| 7,980,589 B2 | 7/2011 | Best | |
| 8,146,943 B2 | 4/2012 | Fukawatase | |
| 8,205,909 B2 | 6/2012 | Kalisz | |
| 8,231,138 B2 | 7/2012 | Sadr | |
| 8,308,186 B1 | 11/2012 | Orlowsky et al. | |
| 8,328,230 B1 | 12/2012 | Kalisz | |
| 8,336,910 B1 | 12/2012 | Kalisz et al. | |
| 2001/0054811 A1 | 12/2001 | Spencer | |
| 2002/0125691 A1 | 9/2002 | Conlee | |
| 2002/0171231 A1 | 11/2002 | Takimoto | |
| 2003/0127819 A1 | 7/2003 | Richardson | |
| 2003/0197354 A1 | 10/2003 | Beland | |
| 2004/0007856 A1 | 1/2004 | Enders | |
| 2004/0075251 A1 * | 4/2004 | Fujii et al. | 280/728.3 |
| 2004/0075252 A1 | 4/2004 | Pan | |
| 2004/0099644 A1 | 5/2004 | Allen | |
| 2004/0100075 A1 | 5/2004 | Sakai | |
| 2004/0135353 A1 | 7/2004 | Enders | |
| 2004/0145163 A1 | 7/2004 | Galmiche | |
| 2004/0155447 A1 | 8/2004 | Smith | |
| 2004/0163872 A1 | 8/2004 | Lincoln | |
| 2004/0163873 A1 | 8/2004 | Polz | |
| 2004/0178616 A1 | 9/2004 | Yoshikawa | |
| 2004/0232666 A1 | 11/2004 | Sato | |
| 2005/0023802 A1 | 2/2005 | Enders | |
| 2005/0029781 A1 | 2/2005 | Enders | |
| 2005/0052005 A1 | 3/2005 | Lunt | |
| 2005/0052010 A1 | 3/2005 | Best | |
| 2005/0052011 A1 | 3/2005 | Best | |
| 2005/0057024 A1 | 3/2005 | Weston | |
| 2005/0073134 A1 | 4/2005 | Matsuura | |
| 2005/0098996 A1 | 5/2005 | Enders | |
| 2005/0116449 A1 | 6/2005 | Enders | |
| 2005/0253369 A1 * | 11/2005 | Taoka | 280/752 |
| 2006/0214400 A1 | 9/2006 | Enders | |
| 2007/0007753 A1 | 1/2007 | Williams | |
| 2007/0052219 A1 | 3/2007 | Rust | |
| 2007/0108746 A1 | 5/2007 | Ochiai | |
| 2007/0108747 A1 | 5/2007 | Roychoudhury | |
| 2007/0152431 A1 | 7/2007 | Rust | |
| 2007/0273179 A1 | 11/2007 | Hommel et al. | |
| 2007/0296187 A1 | 12/2007 | Ochiai | |
| 2008/0061537 A1 | 3/2008 | Enders | |
| 2008/0203714 A1 | 8/2008 | Untersinger | |
| 2009/0152848 A1 | 6/2009 | Sadr | |
| 2009/0152849 A1 | 6/2009 | Saraf | |
| 2009/0250915 A1 | 10/2009 | Best | |
| 2010/0052296 A1 | 3/2010 | Sasaki | |
| 2010/0194081 A1 | 8/2010 | Thomas | |
| 2010/0320736 A1 | 12/2010 | Traber | |
| 2010/0327566 A1 | 12/2010 | Matsushima | |
| 2011/0109064 A1 | 5/2011 | Best | |
| 2011/0115201 A1 | 5/2011 | Best | |
| 2011/0123739 A1 | 5/2011 | Ciplijauskas | |
| 2011/0133435 A1 | 6/2011 | Sadr | |
| 2011/0156378 A1 | 6/2011 | Matsushima | |
| 2011/0198827 A1 | 8/2011 | Roychoudhury | |
| 2012/0080871 A1 | 4/2012 | Roychoudhury | |
| 2012/0248741 A1 | 10/2012 | Kalisz | |
| 2012/0267878 A1 | 10/2012 | Kalisz et al. | |

FOREIGN PATENT DOCUMENTS

| | | |
|---|---|---|
| DE | 3737081 | 5/1989 |
| DE | 19546143 | 6/1997 |

(56) References Cited

FOREIGN PATENT DOCUMENTS

| | | |
|---|---|---|
| DE | 10123207 | 7/2002 |
| DE | 19858520 | 3/2004 |
| EP | 274535 | 7/1988 |
| EP | 0684164 | 11/1995 |
| EP | 0684164 A1 | 11/1995 |
| EP | 678425 | 9/1997 |
| EP | 872390 | 10/1998 |
| EP | 1426249 | 6/2004 |
| EP | 1663725 | 12/2009 |
| GB | 2272670 | 4/1996 |
| JP | 57058532 | 4/1982 |
| JP | 63-002741 | 1/1988 |
| JP | 6320744 | 8/1988 |
| JP | 02-829460 | 6/1990 |
| JP | 2249740 | 10/1990 |
| JP | 4083653 | 7/1992 |
| JP | 5016758 | 1/1993 |
| JP | 06-037011 | 5/1994 |
| JP | 7291084 | 11/1995 |
| JP | 08-258604 | 10/1996 |
| JP | 10504784 | 5/1998 |
| JP | 10512210 | 11/1998 |
| JP | 11-028998 | 2/1999 |
| JP | 11-091454 | 4/1999 |
| JP | 11334515 | 12/1999 |
| JP | 2000006751 | 1/2000 |
| JP | 2000-326810 | 11/2000 |
| JP | 2002-522286 | 7/2002 |
| JP | 2003517966 | 6/2003 |
| JP | 2004026126 | 1/2004 |
| JP | 2004182231 | 7/2004 |
| JP | 2004249960 | 9/2004 |
| JP | 2004-338677 | 12/2004 |
| JP | 2007-504050 | 3/2007 |
| JP | 2007-090954 A | 4/2007 |
| JP | 4083653 B2 | 4/2008 |
| JP | 4136876 B2 | 8/2008 |
| WO | WO 00-07851 | 2/2000 |
| WO | WO 00-50270 | 8/2000 |
| WO | WO 2004-071818 | 8/2004 |
| WO | WO 2007-056849 | 5/2007 |
| WO | WO 2009-124394 | 10/2009 |
| WO | WO 2009-124395 | 10/2009 |
| WO | WO 2009-124401 | 10/2009 |
| WO | WO 2009132990 | 11/2009 |

* cited by examiner

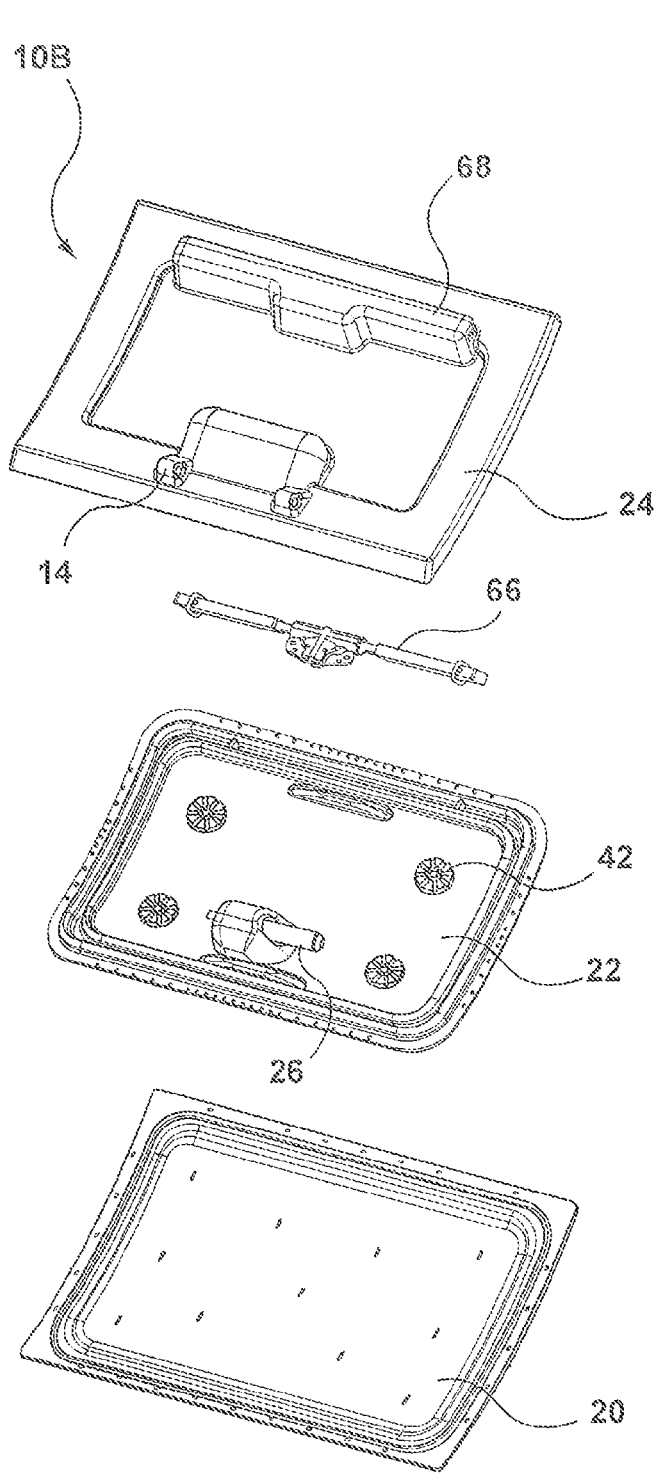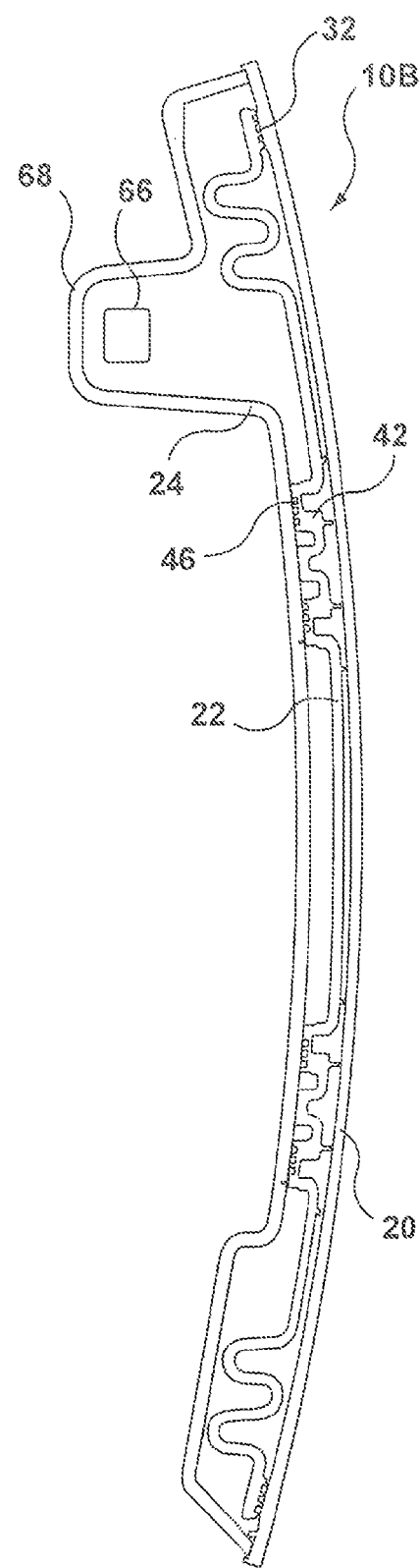
FIG. 7a
FIG. 7b

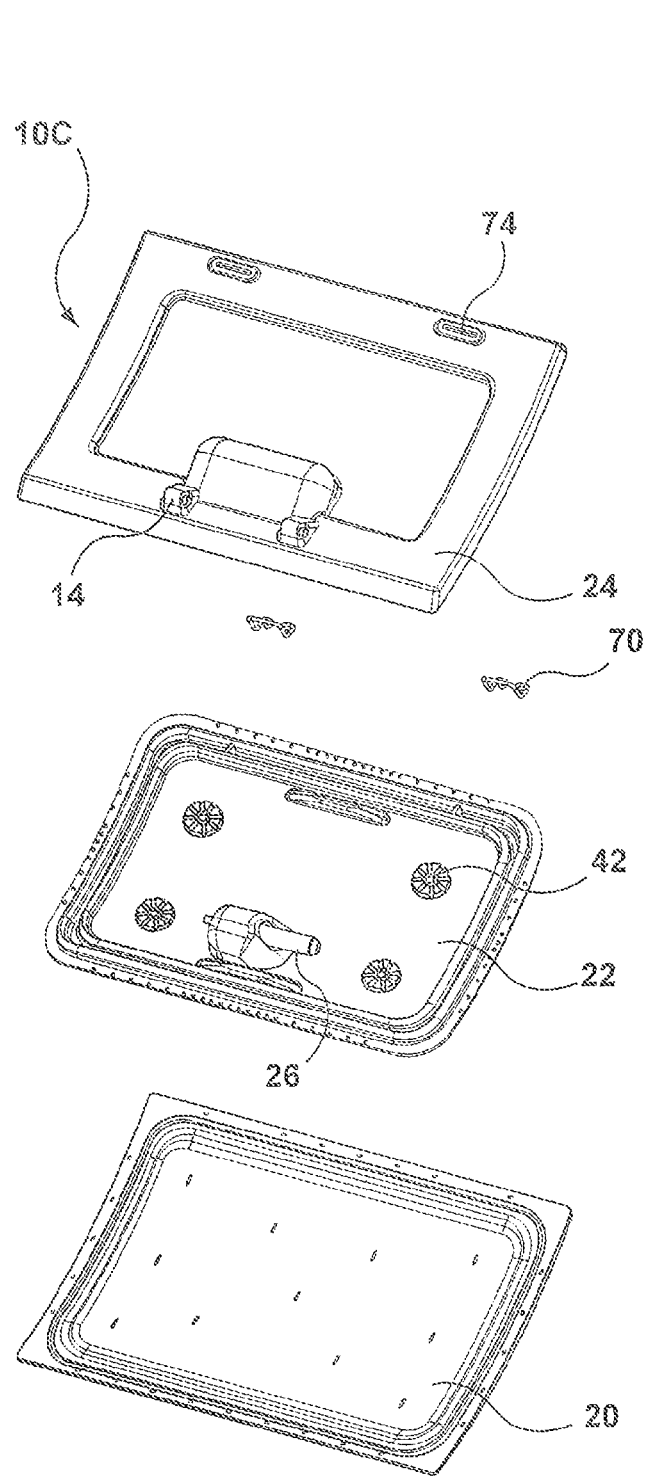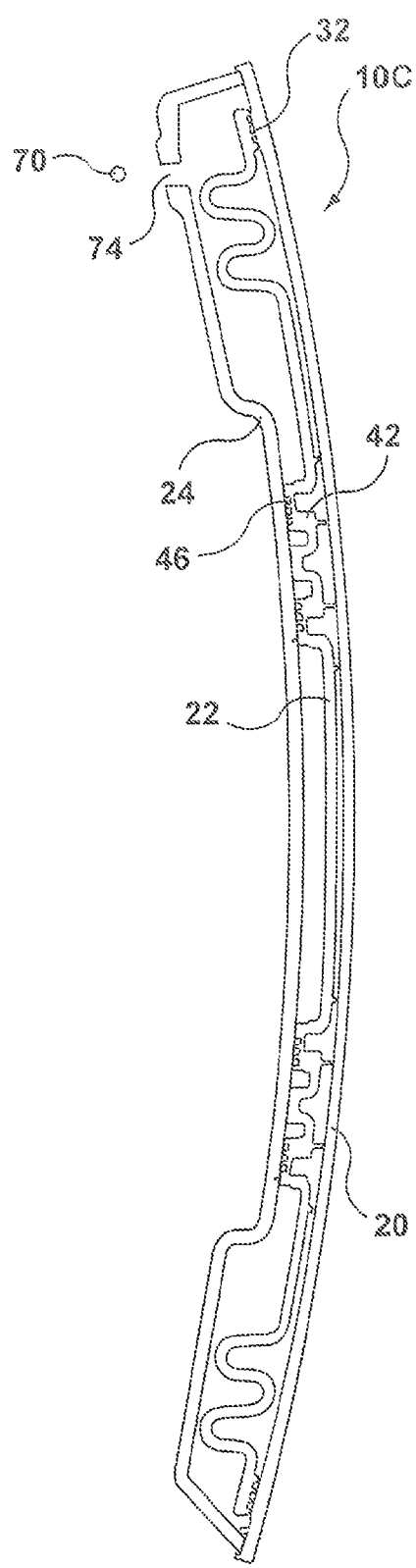
FIG. 8a
FIG. 8b

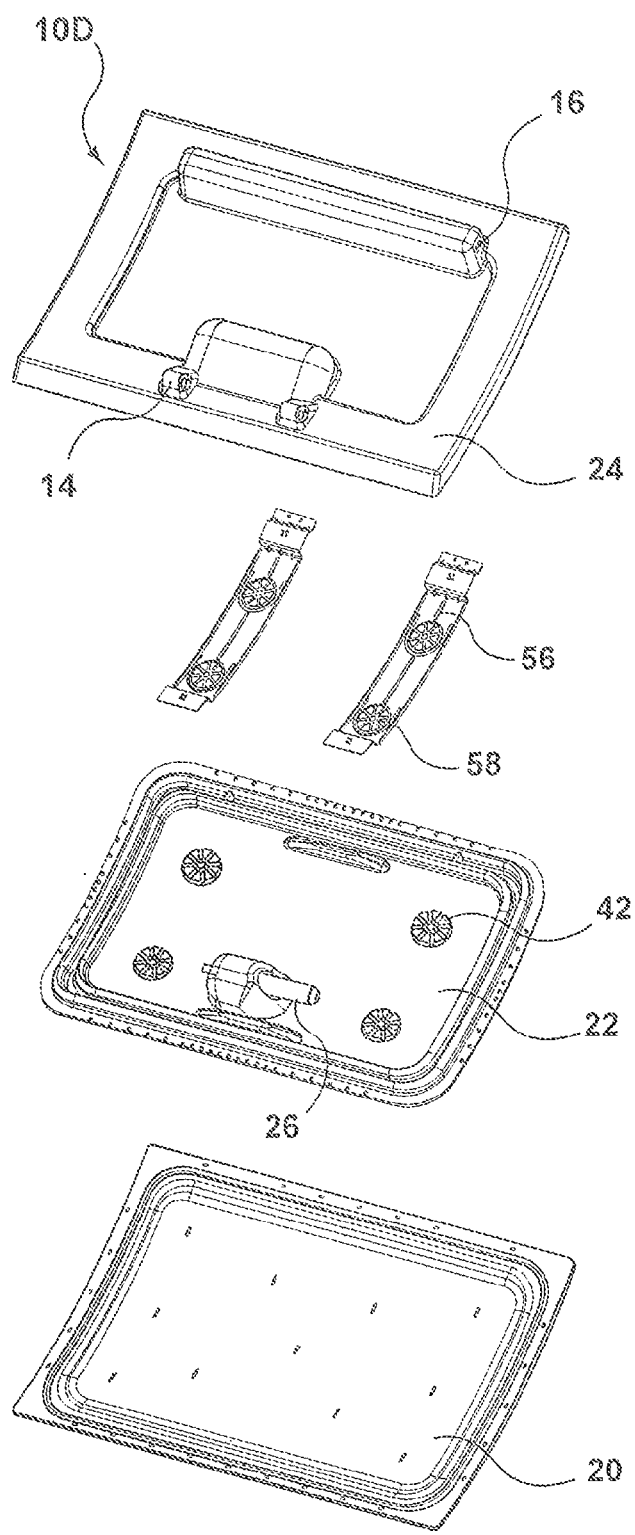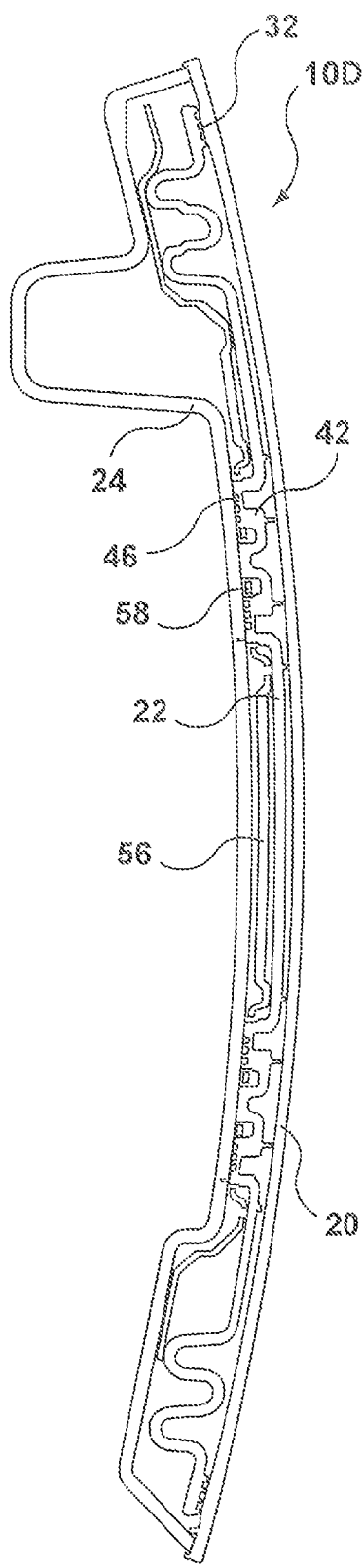
FIG. 9a
FIG. 9b

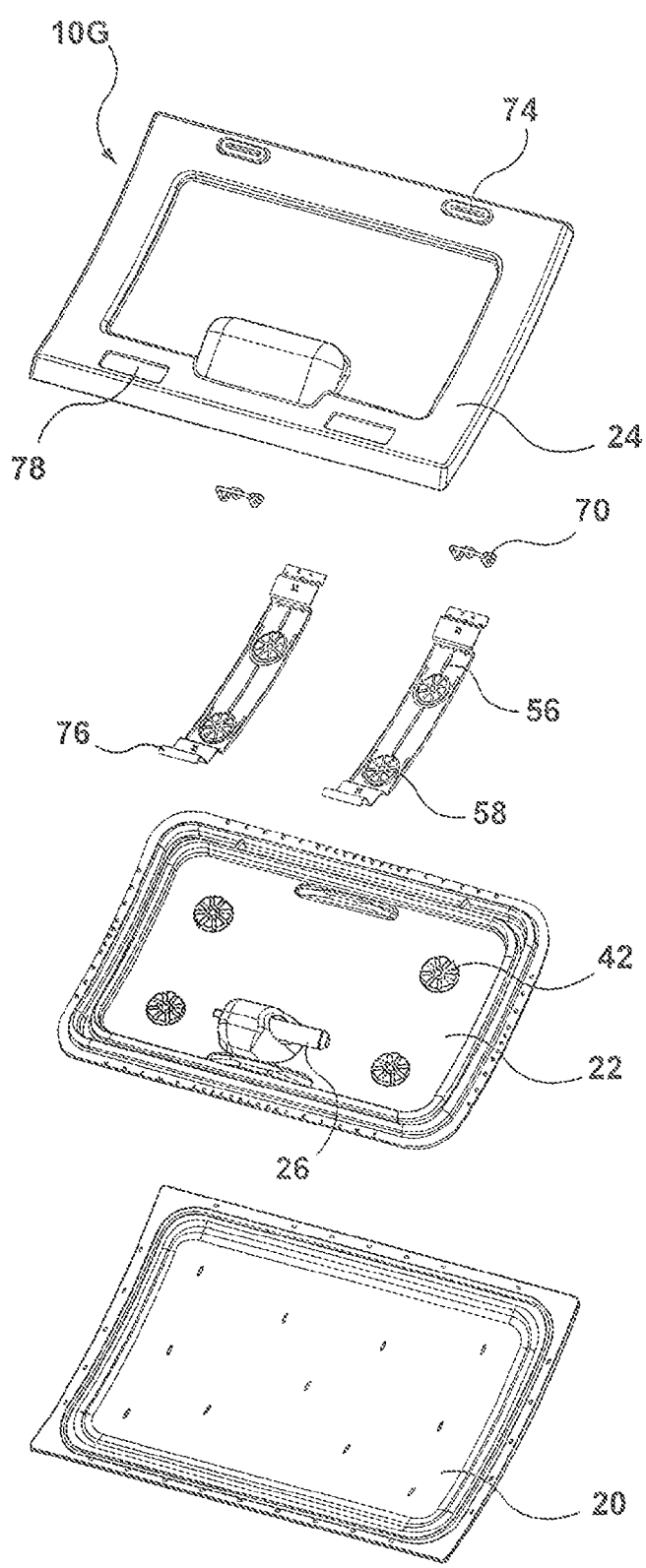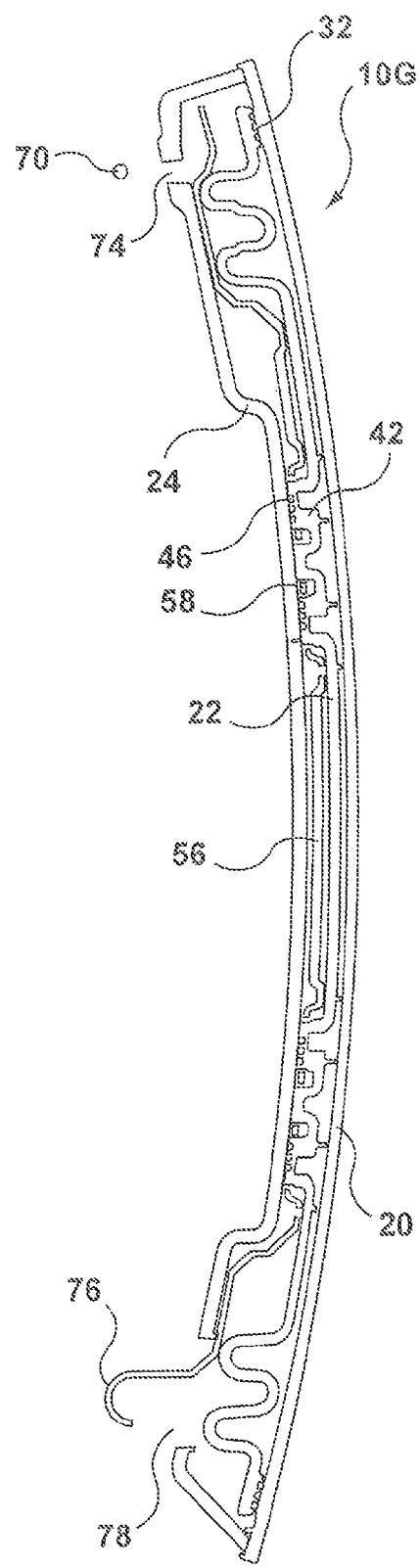
FIG. 12a
FIG. 12b

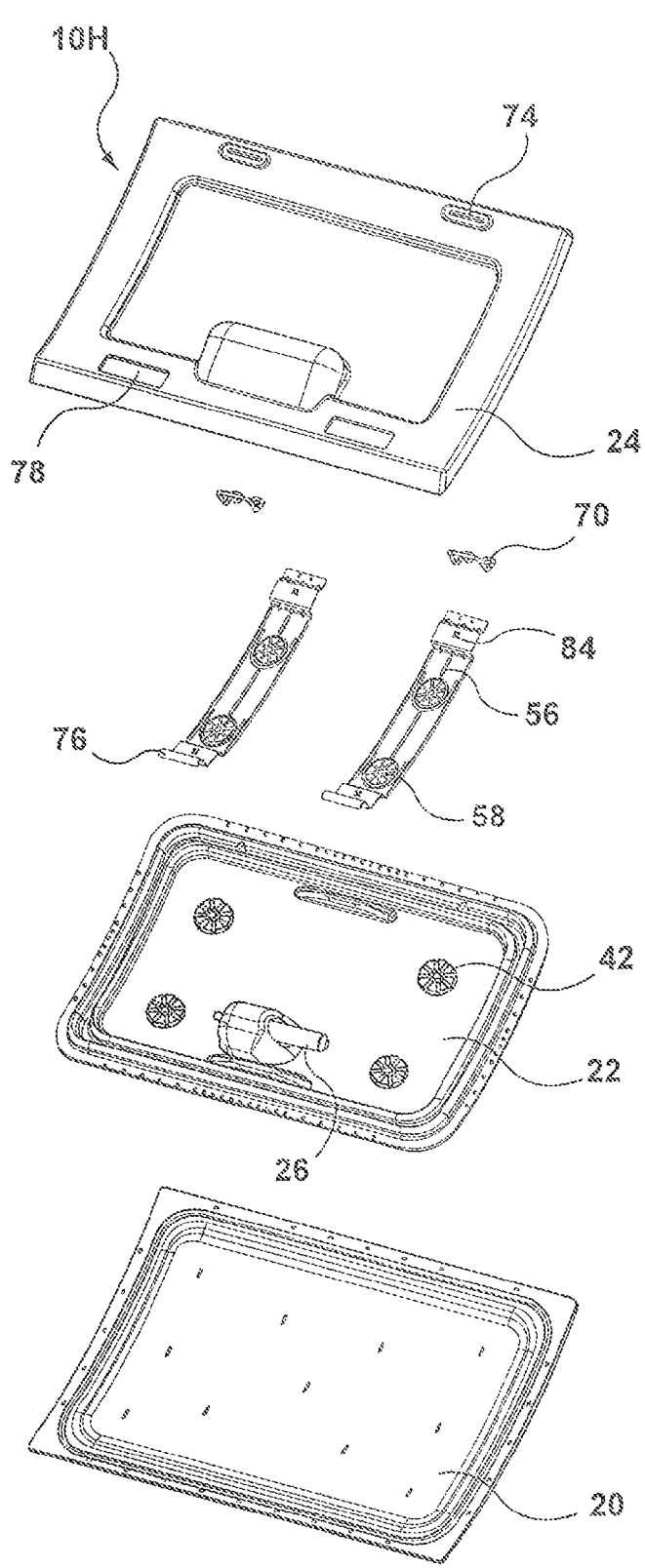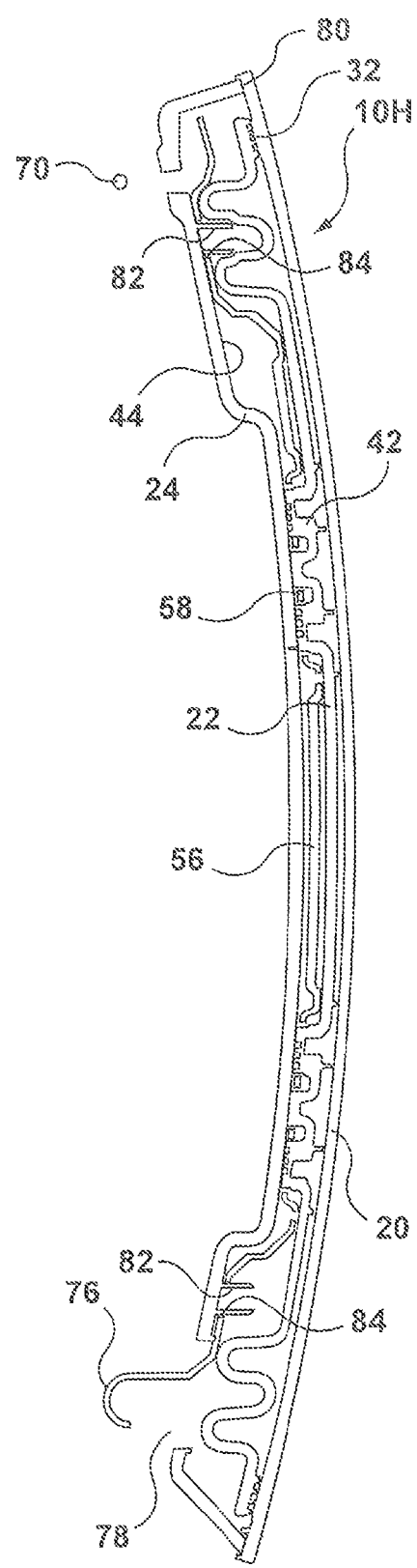
FIG. 13a
FIG. 13b

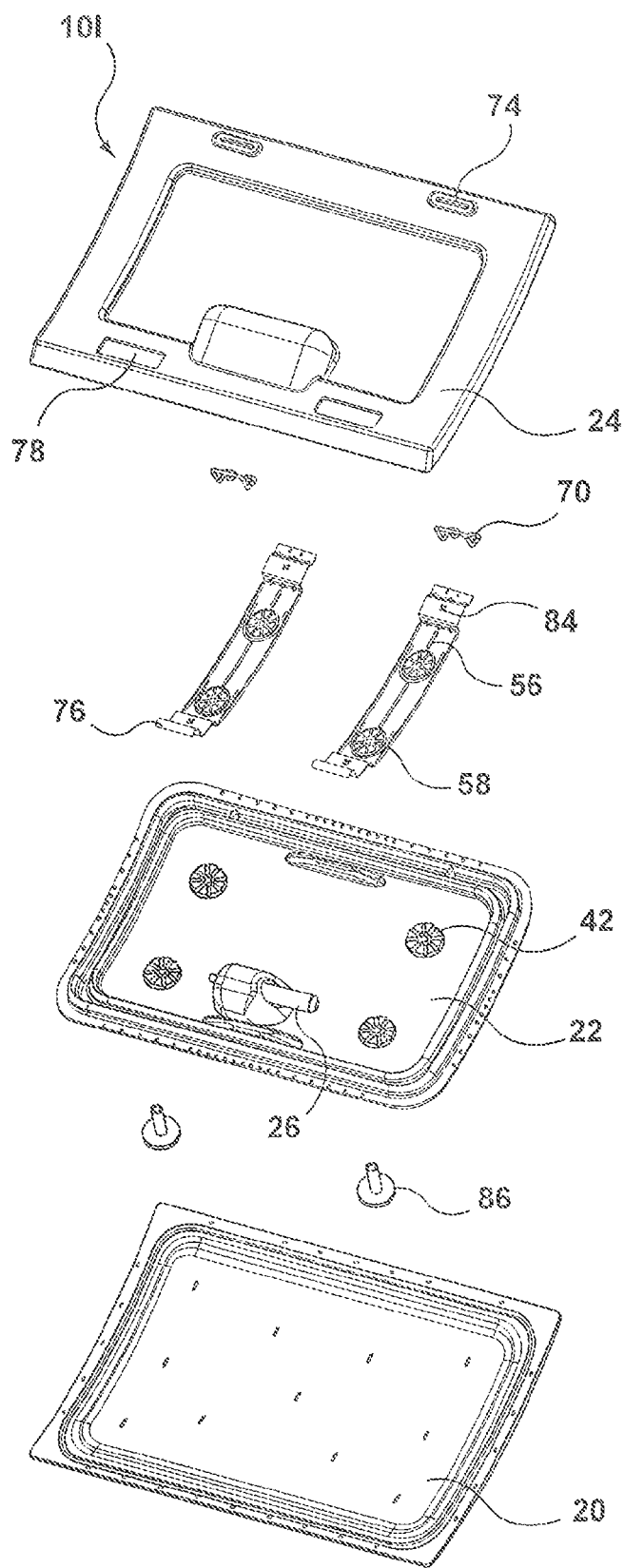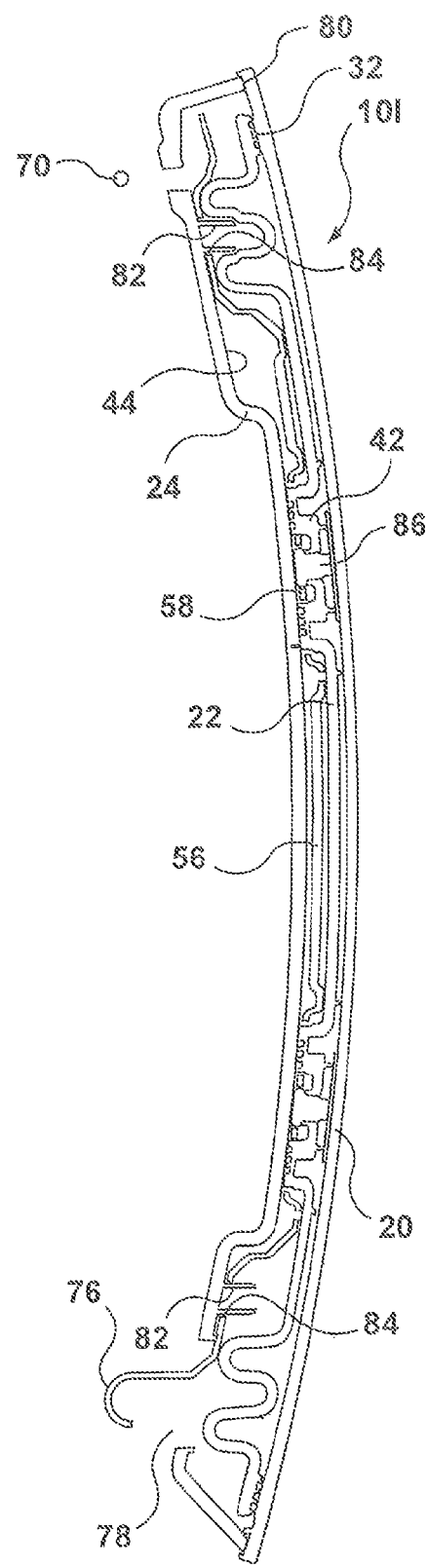
FIG. 14a
FIG. 14b

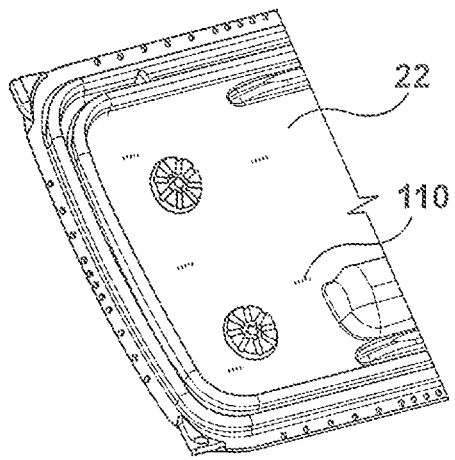 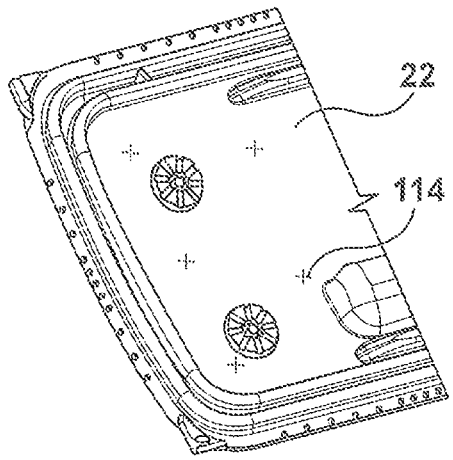
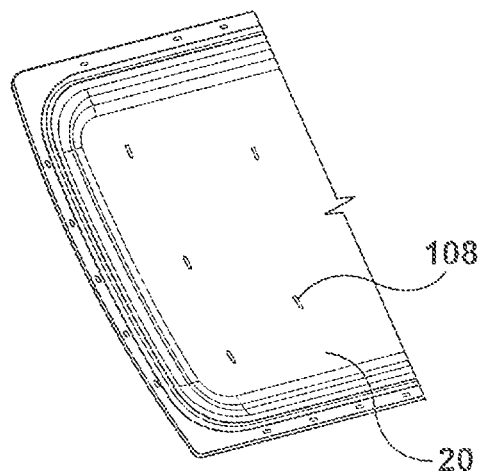 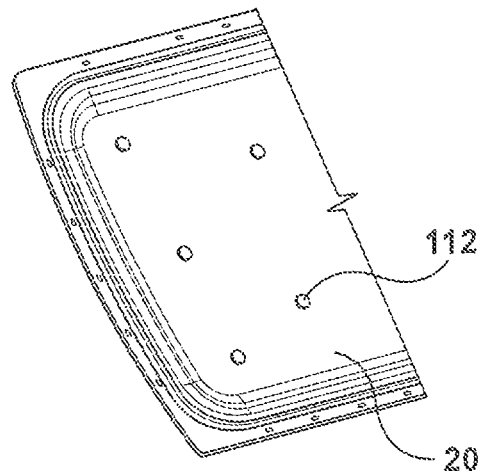
FIG. 20a  FIG. 20b

ACTIVE BOLSTER

CROSS-REFERENCE TO RELATED APPLICATION

This is a non-provisional application claiming priority under 35 USC §119 to U.S. Provisional Patent Application Ser. No. 61/411,788 filed on Nov. 9, 2010.

FIELD OF THE DISCLOSURE

The present disclosure relates to an energy management system for a crash impact event, and in particular to an inflatable active bolster.

BACKGROUND OF THE DISCLOSURE

Several types of devices have been proposed for protecting vehicle occupants during a crash event. Such devices can be categorized as being either passive devices or active devices.

Passive safety devices deform to absorb energy during a crash event. Passive devices, however, remain in a fixed position during a crash event. Accordingly, there may be a relatively large distance over which the vehicle occupant may accelerate during a crash event before encountering a passive device.

Active safety devices are those that deploy during a crash event so that they are positioned relatively close to the vehicle occupants to cushion them. By reducing the distance between the occupant and the safety device, the occupant has less time to accelerate before encountering the safety device, and more time to decelerate on engaging the safety device, and therefore is less likely to sustain injury. A typical active safety device incorporates an air bag that inflates immediately after a crash event. The air bag is typically a fabric bag that is folded and held in a housing until it is deployed. Air bag devices, however, add complexity and cost to the vehicular subassemblies to which they are added.

It would be advantageous to provide an active safety device that is relatively inexpensive to incorporate into a vehicle.

It would also be advantageous to provide an active safety device that is relatively easy to service.

SUMMARY OF THE DISCLOSURE

According to an aspect of an embodiment, provided is an active bolster for a vehicle occupant, the active bolster comprising a rear panel, an internal structure, and a front panel. The internal structure is disposed between the rear panel and the front panel, and the internal structure and rear panel together forming a hollow chamber in communication with an inflation device. The hollow chamber is expandable on activation of the inflation device. The internal structure has at least one expandable element such that upon pressurization of the hollow chamber by the inflation device, at least a portion of the at least one expandable element undergoes deformation to permit inflation of the hollow chamber, thereby displacing the rear panel rearwardly to an extended position.

According to another aspect of an embodiment, provided is an active bolster for a vehicle occupant, the active bolster comprising a rear panel, an internal structure, a front panel, and a reinforcement plate. The internal structure is disposed between the rear panel and the front panel, and the reinforcement plate is disposed between the front panel and the internal structure. The internal structure and rear panel together form a hollow chamber in communication with an inflation device, the hollow chamber being expandable on activation of the inflation device. The internal structure has at least one expandable element such that upon pressurization of the hollow chamber by the inflation device, at least a portion of the at least one expandable element undergoes deformation to permit inflation of the hollow chamber, displacing the rear panel rearwardly to an extended position.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 2b is a perspective exploded view of the active bolster of FIG. 2a.

FIG. 6b is a side sectional view of the active bolster of FIG. 6a.

FIG. 7a is a perspective exploded view of a second exemplary configuration of the active bolster.

FIG. 7b is a side sectional view of the active bolster of FIG. 7a.

FIG. 8a is a perspective exploded view of a third exemplary configuration of the active bolster.

FIG. 8b is a side sectional view of the active bolster of FIG. 8a.

FIG. 9a is a perspective exploded view of a forth exemplary configuration of the active bolster.

FIG. 9b is a side sectional view of the active bolster of FIG. 9a.

FIG. 10b is a side sectional view of the active bolster of FIG. 10a.

FIG. 11b is a side sectional view of the active bolster of FIG. 11a.

FIG. 12a is a perspective exploded view of a seventh exemplary configuration of the active bolster.

FIG. 12b is a side sectional view of the active bolster of FIG. 12a.

FIG. 13a is a perspective exploded view of a eighth exemplary configuration of the active bolster.

FIG. 13b is a side sectional view of the active bolster of FIG. 13a.

FIG. 14a is a perspective exploded view of a ninth exemplary configuration of the active bolster.

FIG. 14b is a side sectional view of the active bolster of FIG. 14a.

FIG. 15b is a side sectional view of the active bolster of FIG. 15a.

FIG. 16b is a side sectional view of the active bolster of FIG. 16a.

FIG. 17b is a diagrammatic plan view of the front panel of the active bolster of FIG. 17a.

FIGS. 20a and 20b are partial perspective views of the real panel and internal structure, showing the incorporation of tack-off features.

DETAILED DESCRIPTION OF PRESENT DISCLOSURE

Specific embodiments of the present disclosure will now be described with reference to the figures. The following detailed description is merely exemplary in nature and is not intended to limit the invention or the application and uses of the invention. A person skilled in the relevant art will recognize that other configurations and arrangements can be used without departing from the scope of the invention. Although the description of the embodiments hereof is in the context of vehicular active bolsters, the invention may also be used in other active bolster arrangements. Furthermore, there is no intention to be bound by any expressed or implied theory presented in the preceding technical field, background, brief summary or the following detailed description.

In one embodiment, provided is a three piece active bolster system that includes a front panel, an interior pleated expandable structure and a rear panel. Front refers to the front of a vehicle and rear refers to facing an occupant, although different orientations are possible. The front panel provides a reaction plate surface, and is furthest from the occupant that is being protected. In one embodiment, the multi-piece structure is plastic injection molded. In another embodiment, the front cover provides rigidity and stiffness to function as the reaction plate. In one embodiment, the front cover is a metal material.

The three piece active bolster system may be incorporated into a glove box door configuration.

Still another embodiment provides a three piece active bolster system wherein the front panel is removable by way of non-permanent attachment through the use of clip-type fasteners. In another configuration, the non-permanent attachment of the front panel makes use of tabs which are captured by pins and the latch mechanism. Other embodiments include inner hinge (i.e., jewel case type) pins, retractable (i.e., watch type) pins, and hinged tabs to join the sections of the active bolster system.

In other embodiments, the active bolster incorporates the use of rigidity-improving polygonal structures (e.g. honeycomb structure) molded into the interior structure and/or the front panel. The interior structure may be comprised of one or more pieces. In a non-serviceable version of the bolster, the ribs may be welded to the front panel.

According to another concept a safety system is provided. The safety system includes a three piece active bolster and an electronic control unit. One or more three piece active bolsters may be incorporated, for example, into an instrument panel or door panel.

These concepts and others are described below with reference to the Figures.

Figure 1:
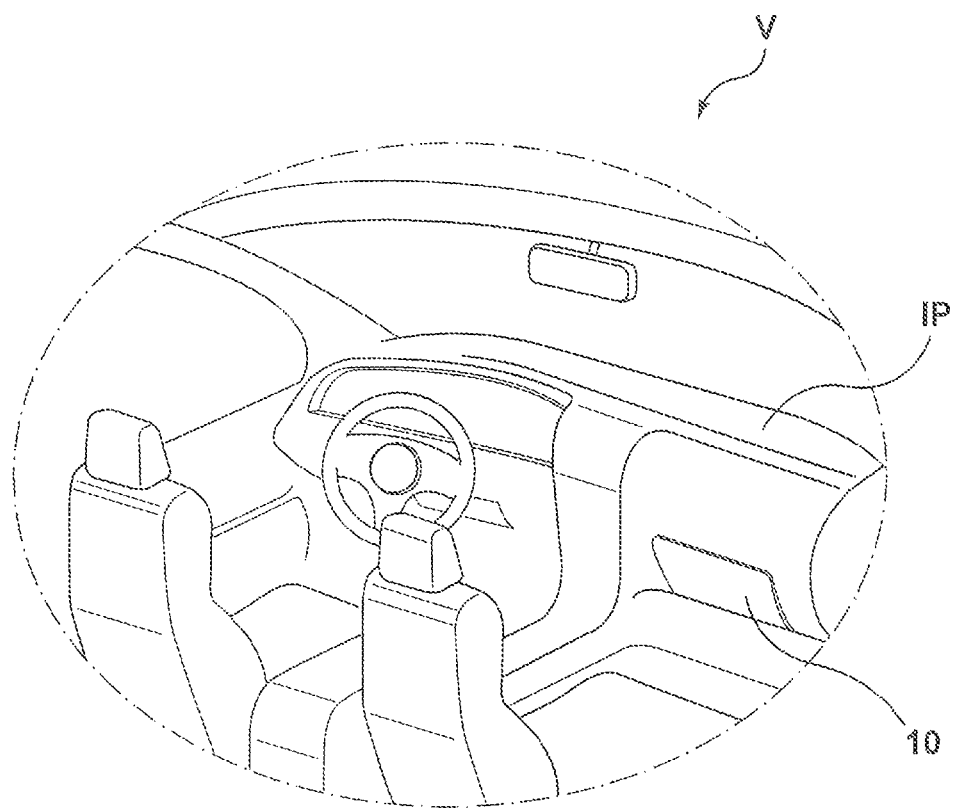
FIG. 1 is a perspective view of an active bolster system in a vehicle in its unexpanded state according to one exemplary embodiment.

Turning now to FIG. 1, presented is a vehicle V including an instrument panel IP and a safety system including an active bolster 10. Active bolster 10 is an active safety device forming part or all of an energy management system or safety system of vehicle V. Active bolster 10 is disposed proximate, and may be attached to, instrument panel IP. In a non-expanded state, active bolster 10 is generally flush with instrument panel IP. Upon activation, a portion of active bolster 10 expands (i.e., moves distally) away from instrument panel IP to absorb kinetic energy from a moving object, such as an occupant of the vehicle located rearward of active bolster 10. For example, activation may occur upon the detection of a deceleration event (e.g., when vehicle V runs into an object) or a sudden acceleration event (e.g., when vehicle V is contacted from the rear by another vehicle). Sensors (not shown), such as accelerometers, are provided for vehicle V to detect such a change in velocity. An electronic control unit (ECU), computer or processor, or other means is provided to receive and interpret the signals from the sensors and provide a control signal to initiate active bolster 10 deployment/inflation via an inflator. The ECU may also receive and process signals from other safety related sensors such as, for example, occupant sensors, crash sensors (e.g., magnetic, pressure and/or acceleration) pre-crash sensors (e.g., radar and/or vision sensors). The ECU may also be configured to perform occupant classification and crash detection determinations in order to determine whether to initiate, modify or suppress activation of the bolster.

In one exemplary embodiment, active bolster 10 is used in an automobile. However, in other exemplary embodiments, active bolster 10 may be used in another type of vehicle, including, but not limited to, other on-road motor vehicles, off-road vehicles, trucks, buses, vans, trains, airplanes, marine vehicles, or amusement rides. Active bolster 10 may be positioned so that, upon activation, active bolster 10 is contacted by the knees of the vehicle passenger. Active bolster 10 may be similarly positioned in front of the driver of the vehicle, on the rear of a seat, in a door panel, pillar, headliner, or elsewhere in the vehicle to cushion other parts of the body.

Figure 2A:
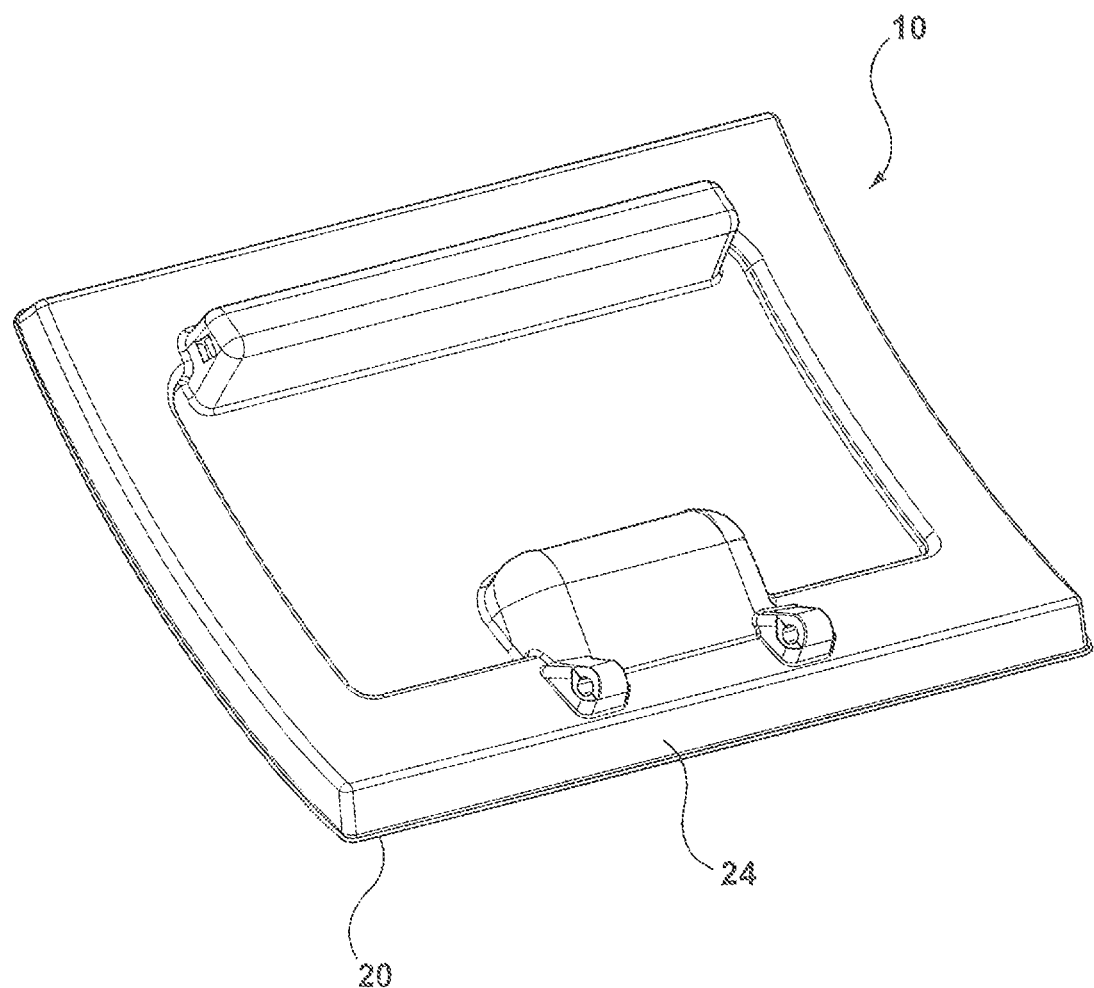
FIG. 2a is a perspective view of an active bolster provided in the form of a glove box, according to one exemplary embodiment.
Figure 2B:
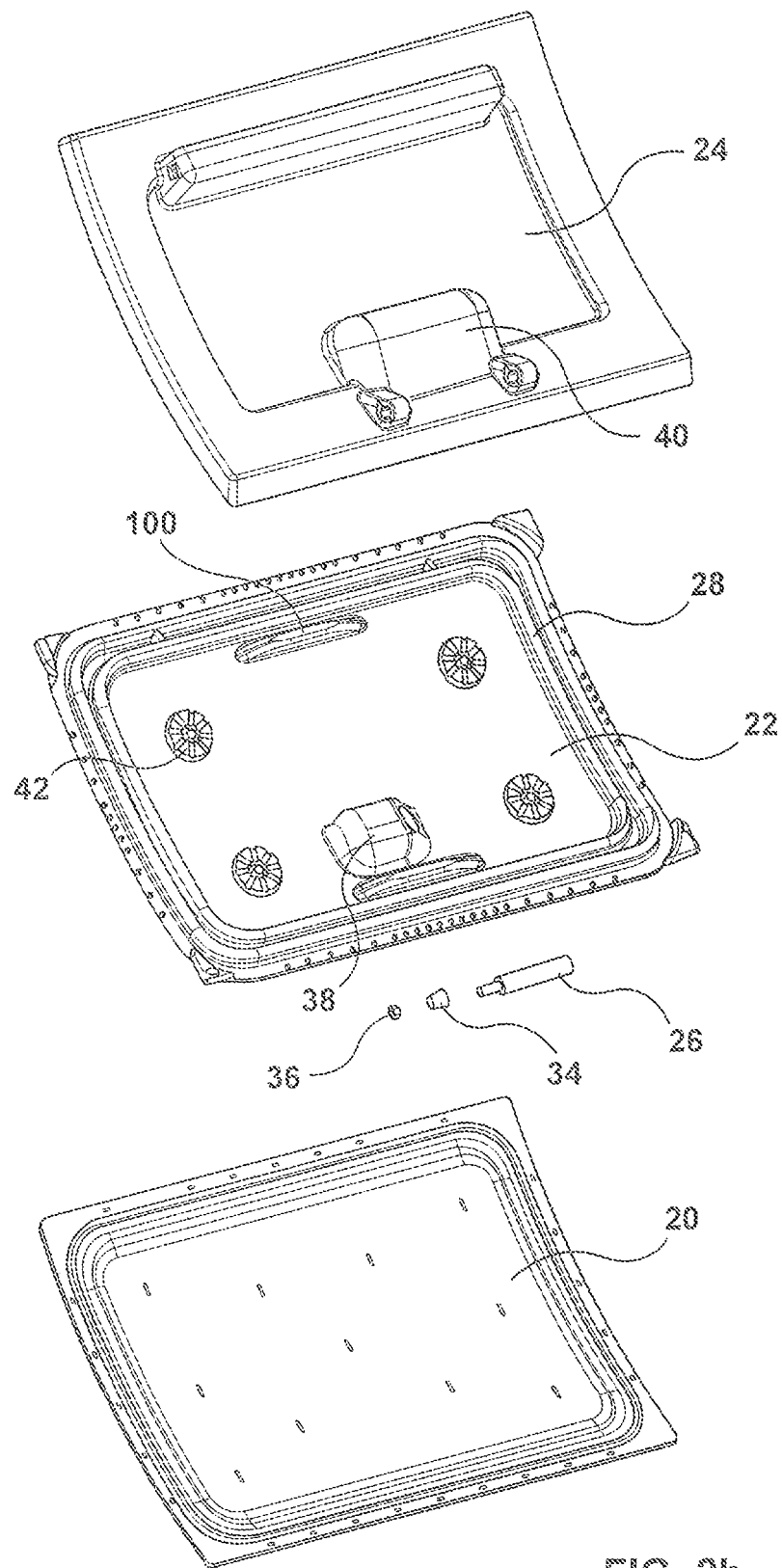

Turning now to FIGS. 2a and 2b, active bolster 10 may be presented in the form of a glove-box door. As shown, active bolster 10 includes a rear panel or cover 20, an internal structure or bladder 22, a front panel or reaction plate 24, and an inflation device 26 according to an exemplary embodiment. Front panel 24 provides a support surface for coupling the active bolster to a vehicle. Internal structure 22 is disposed substantially between rear panel 20 and front panel 24, and includes at least one expandable element, for example expandable pleats 28 about at least a portion of the periphery of said internal structure. In the assembled state, internal structure 22 is coupled to both rear panel 20 and front panel 24, to form a closed unit. In particular, internal structure 22 and rear panel 20 together form a hollow body defining a hollow chamber 30 (see FIG. 2c), in communication with inflation device 26. When inflation device 26 is activated, inflation gas is provided to hollow chamber 30 and forces at least a portion of expandable pleats 28 to undergoes deformation to permit inflation of hollow chamber 30, displacing rear panel 20 outwardly to an extended position. Thereby, the volume of hollow chamber 30 is increased and provides for increased energy absorption capability for active bolster 10. Thus, as shown in dash in FIG. 2c, when inflation device 26 is activated, hollow chamber 30 expands to move rear panel 20 rearwardly away from front panel 24 and into the passenger compartment, and thus towards the occupant in the vehicle.

Expandable pleats 28 may extend substantially around an outside perimeter or periphery of internal structure 22. According to an exemplary embodiment, a series of substantially U-shaped pleats 28 extend inward from the perimeter of internal structure 22. In other exemplary embodiments, pleats 28 may be configured differently, such as having a different cross-sectional shape (e.g., sine curve or rectangle), being of different number (e.g., one pleat, five pleats, or varying number of pleats at different locations), or being disposed in different locations (e.g., top and side perimeter only).

As explained above, internal structure 22 is coupled to rear panel 20 to form a hollow body defining hollow chamber 30. According to one exemplary embodiment, internal structure 22 is welded to rear panel 20 at weld points 32 located around the perimeters of internal structure 22 and rear panel 20 to form hollow chamber 30. Welding may be accomplished by any of numerous methods including, but not limited to, infrared, ultrasonic, subsonic, hotplate, or inductive means. In other embodiments, internal structure 22 is coupled to rear panel 20 by different means (e.g., chemical bonding, fasteners, or the use of adhesives) and in different locations (e.g., interior to the respective perimeters).

Internal structure 22 is also configured to couple to inflation device 26 to provide fluid communication between inflation device 26 and hollow chamber 30. According to one exemplary embodiment, an inflation device includes inflation device 26, an impingement cover 34, and a fastener (e.g. lock nut) 36. Inflation device 26 is releasably coupled directly to internal structure 22 by way of nut 36 to provide direct fluid communication to hollow chamber 30. The inflation device is also disposed within a housing formed collectively by an interior inflator housing 38 of internal structure 22 and a front inflator housing 40 of front panel 24. In other exemplary embodiments, the inflation device is incorporated in different manners including, but not limited to, different coupling arrangements (e.g., permanent, clamps, other fasteners, interference fit, or pressure seals), housing arrangements (e.g., housing integrated with internal structure 22 only), or remote fluid communication (e.g., a tube or channel interposed between inflation device 26 and hollow chamber 30). In one embodiment, inflation device 26 is a compressed gas inflator. In other embodiments, inflation device 26 is a pyrotechnic inflator, hybrid inflator, or any other type of inflator suitable for emitting a pressurized fluid, such as an inflator gas, capable of rapidly expanding hollow chamber 30.

Internal structure 22 is also configured to couple to front panel 24. Front panel 24 is generally configured to have sufficient stiffness and rigidity to provide a reaction surface from which hollow chamber 30 may expand and rear panel 20 may extend. As will be explained in greater detail below, internal structure 22 may be permanently coupled, or removably coupled to front panel 24.

Figure 2C:
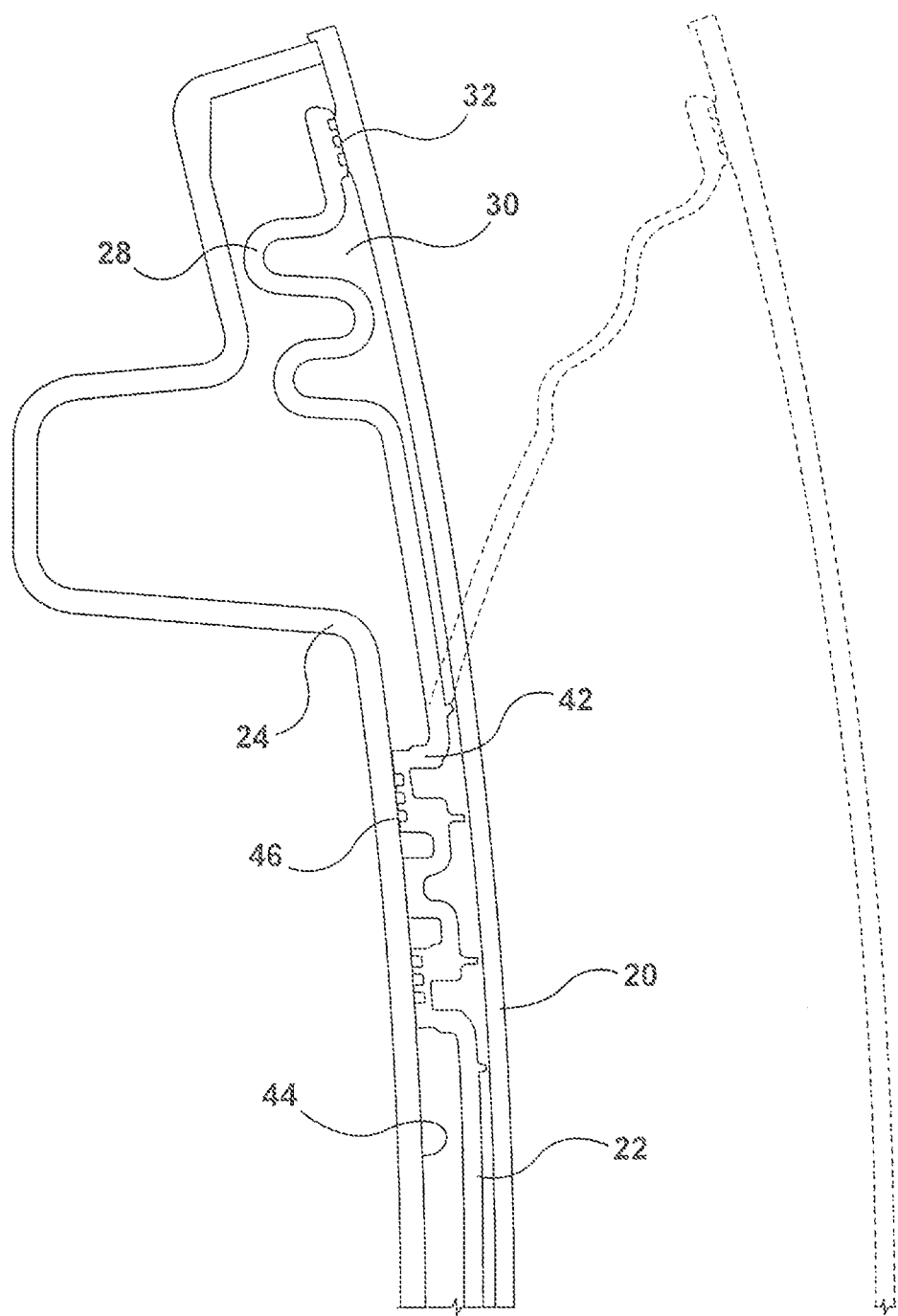
FIG. 2c is a side sectional view of the active bolster of FIG. 2a in an undeployed state, and a deployed state (shown in dot).

In some embodiments, internal structure 22 is irremovably/permanently coupled to front panel 24. For example, in a first arrangement, internal structure 22 and front panel 24 of active bolster 10 are coupled together by welding. As best shown in FIG. 2c, internal structure 22 includes weld protrusions 42 that extend from a surface of internal structure 22 toward the interior surface 44 of front panel 24. The front panel 24 includes weld pads 46 that correspond to weld protrusions 42 located on internal structure 22. Weld pads 46 may be configured to be welded to the corresponding weld protrusions 42 of internal structure 22 by methods including, but not limited to, infrared, ultrasonic, subsonic, hotplate, or inductive means. In other embodiments, weld protrusions 42 and weld pads 46 are coupled in other manners including, but not limited to chemical bonding, adhesives, or mechanical fasteners.

Figure 3:
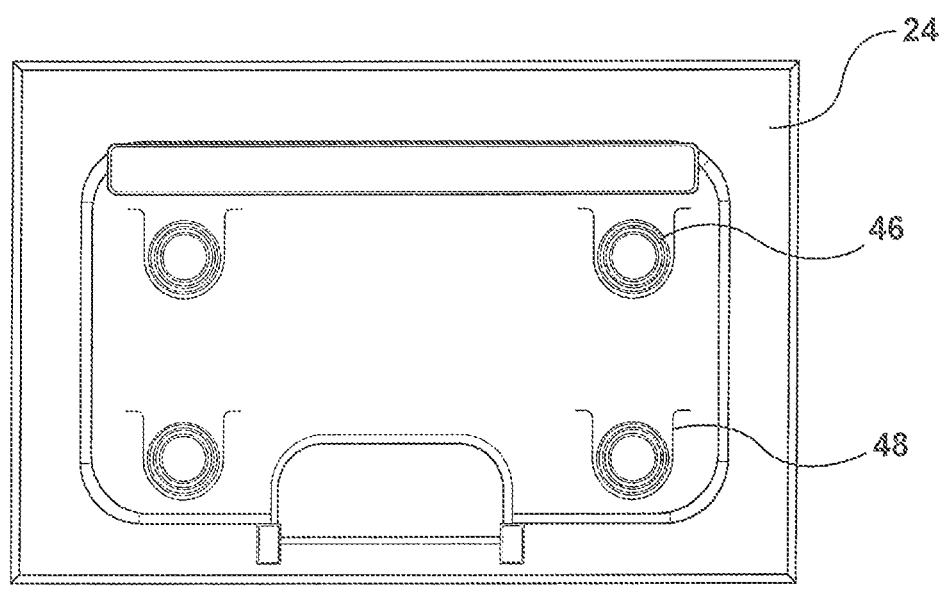
FIG. 3 is a plan view (interior side) of the front panel of the active bolster of FIG. 2a, showing the inclusion of optional U-shaped weakened areas.

In some embodiments, and as shown in FIG. 3, U-shaped weakened areas 48 may be provided to at least one weld pad 46 to function as tear tabs as hollow chamber 30 is inflated upon activation of active bolster 10. During deployment of active bolster 10, the attachment points provided by weld pads 46 and weld protrusions 42 are subject to considerable deformation-inducing forces. The placement of U-shaped weakened areas 48 on front panel 24 serve to decrease the load on these attachment points, reducing the likelihood of failure during deployment. In addition, the inclusion of weld pads 46, weld protrusions 42, and U-shaped areas 48 at certain locations allows for a directionally determinable deployment of active bolster 10, such as allowing hollow chamber 30 to hinge about certain weld pads 46 and tear at other weld pads 46 having U-shaped areas 48. The U-shaped weakened areas may be fully cut through the front panel, or present as thinned regions. To provide access to inflation device 26 for servicing, front panel 24 may include a removable access panel or door, or active bolster 10 may be unserviceable and provide no access to inflation device 26.

Figure 4:
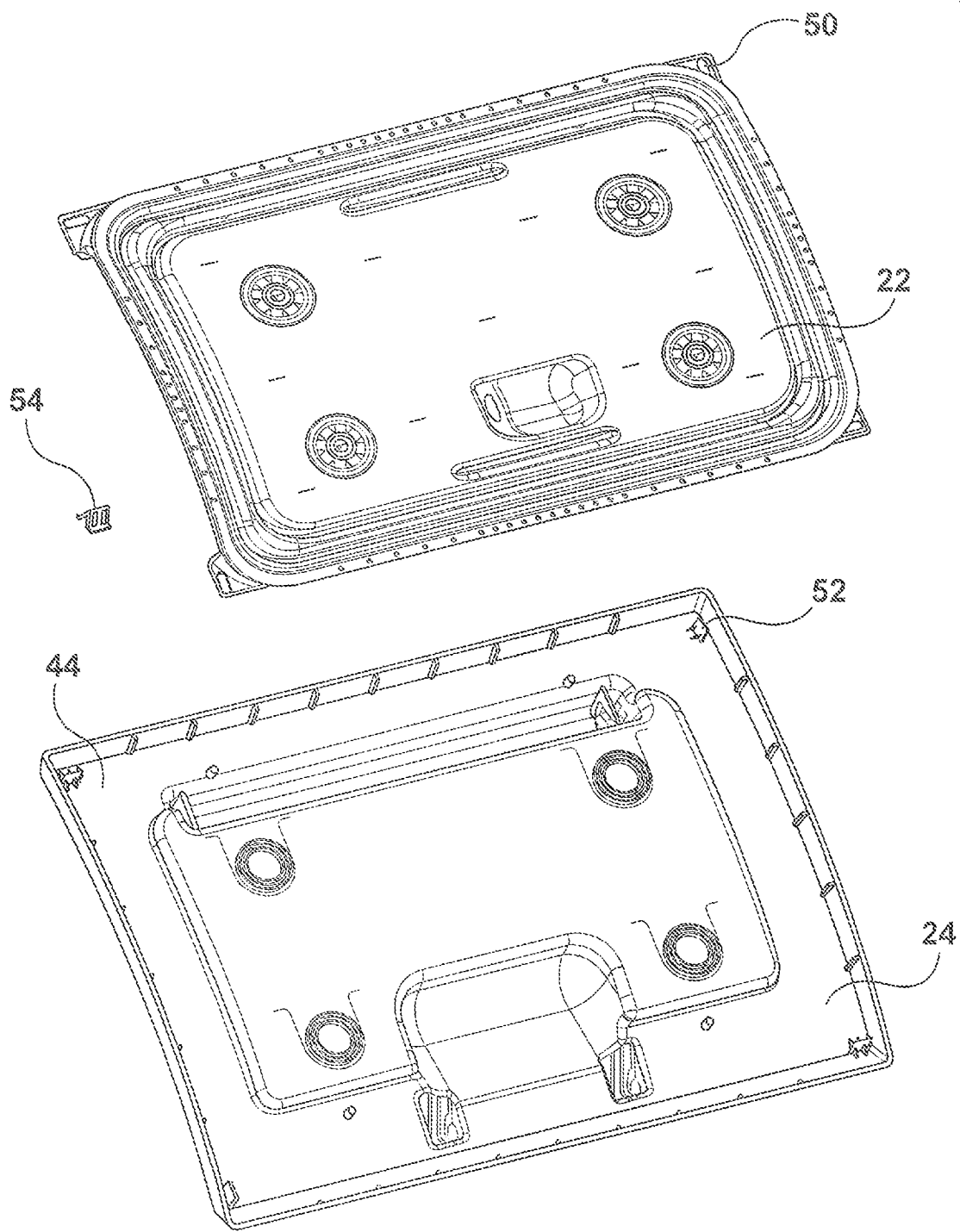
FIG. 4 is a perspective exploded view of an alternate embodiment in which the front panel and internal structure are coupled together using clip-type fasteners.

In other embodiments, to assist in the fit and finish of active bolster in instrument panel IP, internal structure 22 and front panel 24 of active bolster 10 are coupled together using suitable tabs or clip-type fasteners. For example, as shown in FIG. 4, internal structure 22 is provided with tab receptacles 50 at each corner, each receptacle 50 being configured to receive a tab or clip-type fastener 52 provided on the inside surface 44 of rear panel 24. The tab or clip-type fastener 52 may further use a spring clip 54 to ensure secure connection between internal structure 22 and front panel 24. To permit operable expansion of hollow chamber 30 during deployment of active bolster 10, the tab or clip-type fasteners are configured as frangible attachments.

Figure 5A:
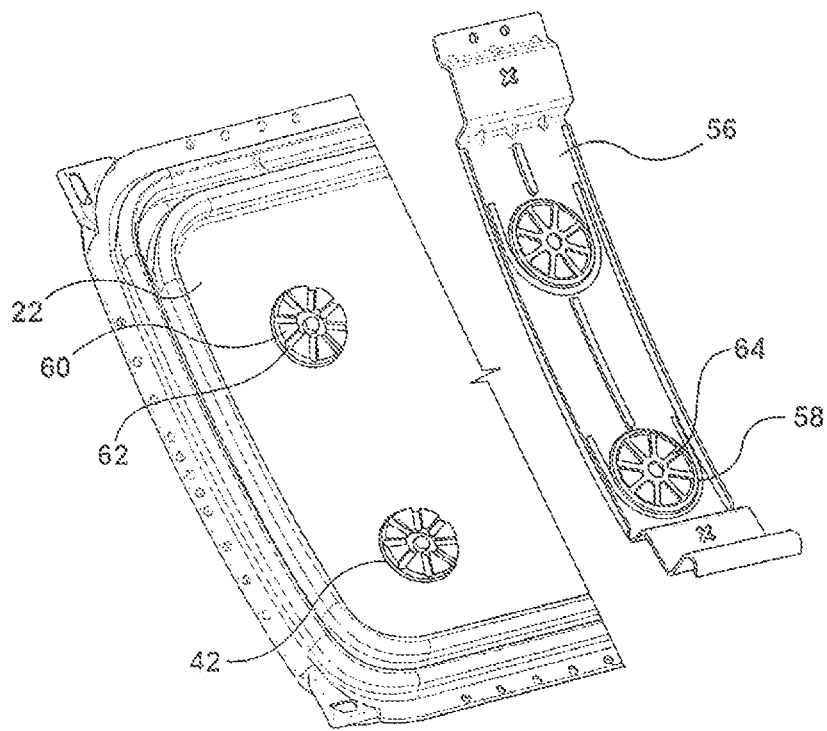
FIG. 5a is a partial perspective view detailing a reinforcement plate relative to the internal structure of the active bolster.
Figure 5B:
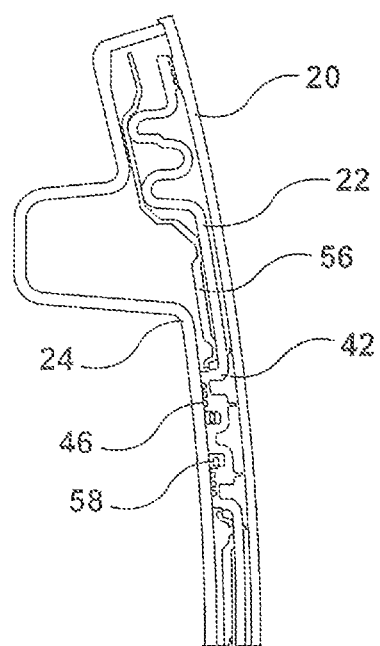
FIG. 5b is a partial side sectional view of an alternate embodiment of the active bolster in which the reinforcement plate is disposed between the front panel and the internal structure.

Referring now to FIGS. 5a and 5b, in some embodiments, the active bolster may additionally comprise one or more reinforcement plates 56 positioned between front panel 24 and internal structure 22. To ensure securement relative to front panel 24 and internal structure 22, reinforcement plate 56 is provided with at least one anchor feature 58 configured to align with weld protrusion 42 of internal structure 22, and weld pad 46 of front panel 24. As such, on welding of weld protrusion 42 to weld pad 46, anchor feature 58 is captured therebetween, as shown in FIG. 5b. As presented herein, weld protrusion 42 is substantially circular and is comprised of a plurality of raised surfaces 60 separated by radially extending channels 62. Anchor feature 58 is provided in a corresponding substantially circular configuration having a series of radially extending ribs 64 that mate with channels 62. As such, upon welding of internal structure 22 to front panel 24, ribs 64 of anchor feature 58 are irremovably fixed within channels 62 of weld protrusion 42, thereby securing reinforcement plate 56 therebetween. In some embodiments, reinforcement plate 56 may comprise U-shaped cut-outs 59 similar to those described above with respect to front panel 24. As with front panel 24, the incorporation of U-shaped cut-outs 59 on reinforcement plate 56 serves to decrease the load on the attachment points between internal structure 22 and front panel 24 during active bolster 10 deployment.

In other embodiments, anchor feature 58 of reinforcement plate 56 is permanently captured to weld protrusion 42 of internal structure 22 only. In such cases, anchor feature 56 may be retained through the use of rivets or other suitable mechanical (e.g. threaded) fasteners. In other embodiments, anchor feature 58 may be retained by applying sufficient heat to weld protrusion 42 so as to deform it, thus capturing the radially extending ribs 64 therein.

The range of active bolster components detailed above may be presented in a variety of configurations depending on the implementation. A number of non-limiting exemplary embodiments for a glove-box implementation are presented below. For ease of explanation, like-numbers are used for like-parts through the description, with the glove-box active bolster of Assembly A referred to as 10A, the glove-box active bolster of Assembly B referred to as 10B, etc. The various assemblies detailed below are meant to provide examples of possible active bolster configurations. The following is not intended to be limiting in any way, as additional embodiments may arise from combinations of the examples provided below, and all such combinations are intended to fall within the scope of the invention described and claimed herein.

Assembly A

Figure 6A:
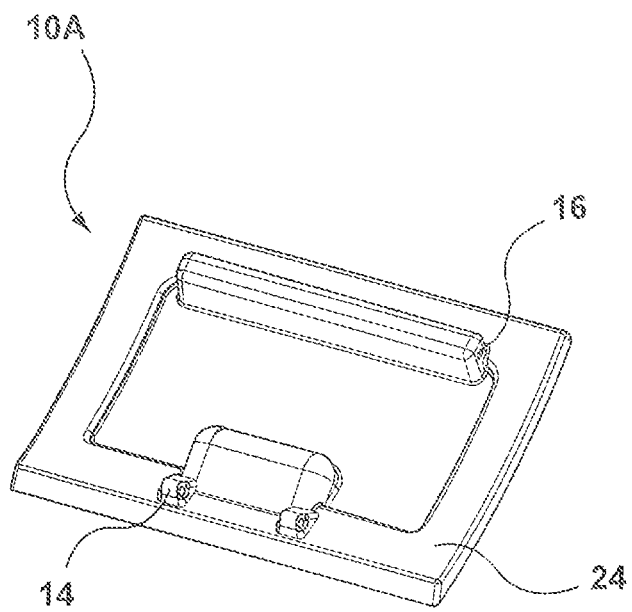
FIG. 6a is a perspective exploded view of a first exemplary configuration of the active bolster.
Figure 6A:
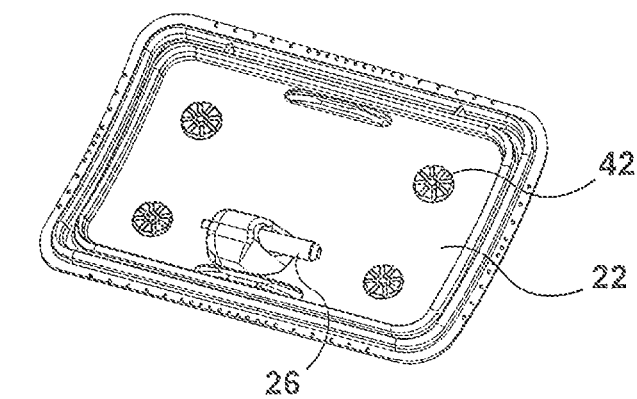
Figure 6A:
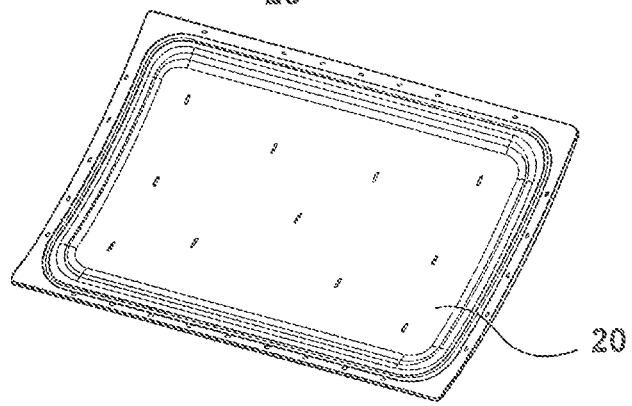
Figure 6B:
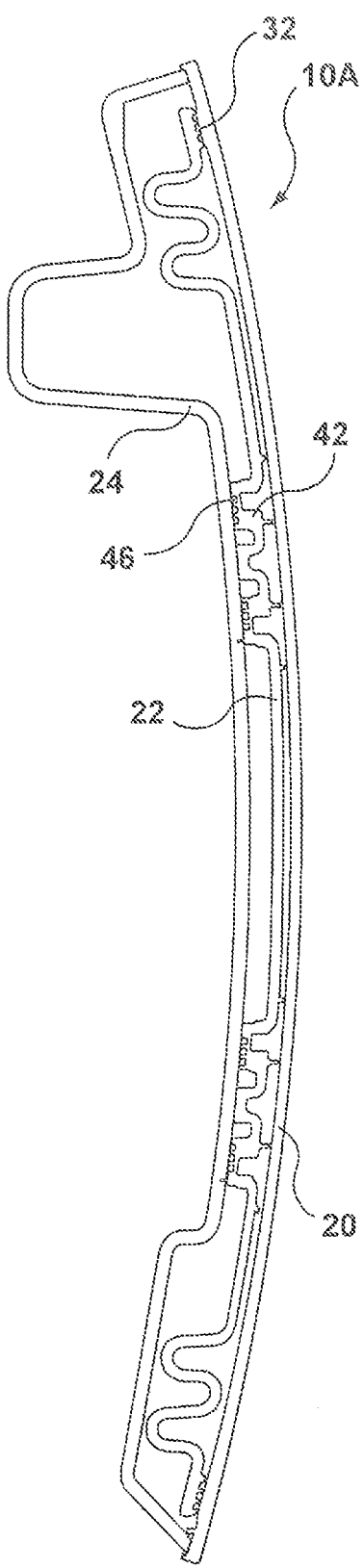

Presented in FIGS. 6a (exploded view), and 6b (cross-sectional view) is a glove-box active bolster 10A according to a first embodiment. As shown, active bolster 10A comprises rear panel 20, internal structure 22, front panel 24, and inflation device 26. Internal structure 22 is welded to rear panel 20 at weld points 32 located around the perimeters of internal structure 22 and rear panel 20 to form the inflatable hollow chamber. Front panel 24 is welded to internal structure 22 via weld protrusions 42 on internal structure 22, and weld pads 46 provided on front panel 24. For the purpose of opening/closing the glove box door, active bolster 10A is designed to operably rotate about hinge 14, which is integrally formed on front panel 24, and by way of pins (not shown) rotatably attaches to instrument panel IP. For locking glove-box active bolster 10A, at least one latching aperture 16 is provided in front panel 24 which cooperates with a latching mechanism provided in instrument panel IP. In this configuration, the load path during deployment is primarily through front panel 24, and in particular through hinge 14 and latching aperture 16.

Assembly B

Presented in FIGS. 7a (exploded view) and 7b (cross-sectional view) is a glove-box active bolster 10B according to a second embodiment. As shown, active bolster 10B comprises rear panel 20, internal structure 22, front panel 24, and inflation device 26. Internal structure 22 is welded to rear panel 20 at weld points 32 located around the perimeters of internal structure 22 and rear panel 20 to form the inflatable hollow chamber. Front panel 24 is welded to internal structure 22 via weld protrusions 42 on internal structure 22, and weld pads 46 provided on front panel 24. For the purpose of opening/closing the glove box door, active bolster 10B is designed to operably rotate about hinge 14, which is integrally formed on front panel 24, and by way of pins (not shown) rotatably attaches to instrument panel IP. For locking glove-box active bolster 10B in the closed position, a latch mechanism 66 is provided in latch housing 68 of front panel 24. Latch mechanism 66 cooperates with a latch aperture (not shown) provided on instrument panel IP, as generally known in the art. In this configuration, the load path during deployment is primarily through front panel 24, and in particular through hinge 14 and latch mechanism 66 situated in latch housing 68.

Assembly C

Figure 8C:
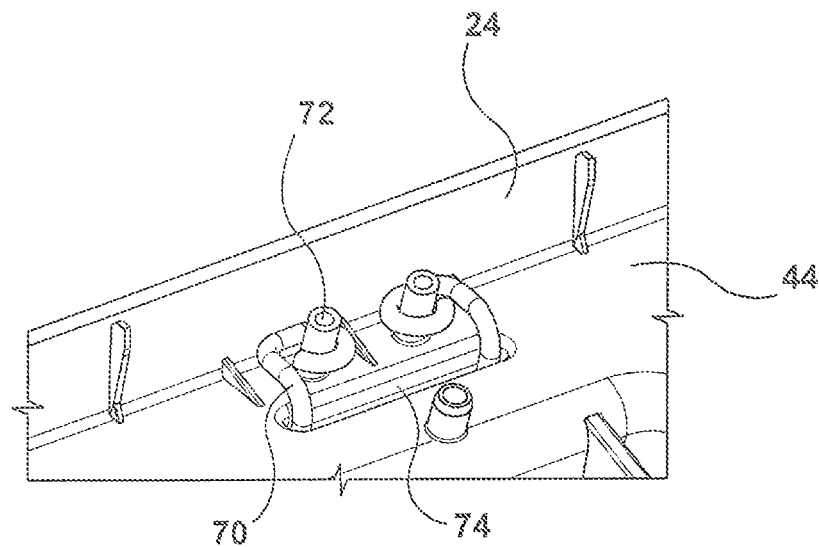
FIG. 8c is an enlarged perspective view of the active bolster of FIG. 8a detailing the mounting of a striker on the front panel.

Presented in FIGS. 8a (exploded view) and 8b (cross-sectional view) is a glove-box active bolster 10C according to a third embodiment. As shown, active bolster 10C comprises rear panel 20, internal structure 22, front panel 24, and inflation device 26. Internal structure 22 is welded to rear panel 20 at weld points 32 located around the perimeters of internal structure 22 and rear panel 20 to form the inflatable hollow chamber. Front panel 24 is welded to internal structure 22 via weld protrusions 42 on internal structure 22, and weld pads 46 provided on front panel 24. For the purpose of opening/closing the glove box door, active bolster 10C is designed to operably rotate about hinge 14, which is integrally formed on front panel 24, and by way of pins (not shown) rotatably attaches to instrument panel IP. For locking glove-box active bolster 10C in the closed position, a pair of strikers 70 are provided which cooperate with a latch mechanism (not shown) provided on instrument panel IP. Strikers 70 are configured with a shape that anchors them relative to front panel 24, for example as shown in FIG. 8c, where strikers 70 are mounted on posts 72 provided on the inside surface 44 of front panel 24. Strikers 70 pass through opening 74 to be exposed outside front panel 24, allowing for engagement with the latching mechanism in instrument panel IP. In this configuration, the load path during deployment is primarily through front panel 24, and in particular through hinge 14 and strikers 70.

Assembly D

Presented in FIGS. 9a (exploded view) and 9c (cross-sectional view) is a glove-box active bolster 10D according to a forth embodiment. As shown, active bolster 10D comprises rear panel 20, internal structure 22, front panel 24, a pair of reinforcement plates 56 and inflation device 26. Internal structure 22 is welded to rear panel 20 at weld points 32 located around the perimeters of internal structure 22 and rear panel 20 to form the inflatable hollow chamber. Front panel 24 is welded to internal structure 22 via weld protrusions 42 on internal structure 22, and weld pads 46 provided on front panel 24. By virtue of anchor feature 58, and the cooperation of anchor feature 58 with weld protrusion 42 and weld pad 46, reinforcement plate 56 is securely captured between front panel 24 and internal structure 22. For the purpose of opening/closing the glove box door, active bolster 10D is designed to operably rotate about hinge 14, which is integrally formed on front panel 24, and by way of pins (not shown) rotatably attaches to instrument panel IP. For locking glove-box active bolster 10D, at least one latching aperture 16 is provided in front panel 24 which cooperates with a latching mechanism provided in instrument panel IP. In this configuration, the load path during deployment is primarily through front panel 24, and in particular through hinge 14 and latching aperture 16.

Assembly E

Figure 10A:
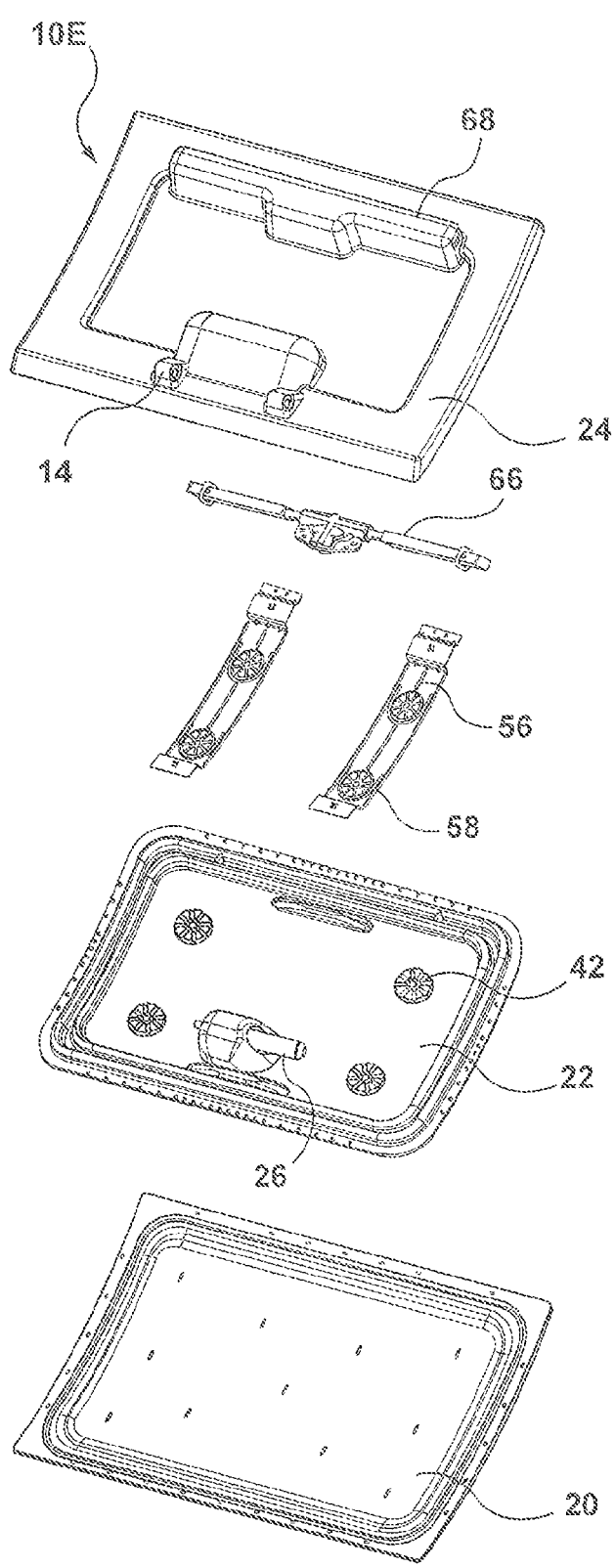
FIG. 10a is a perspective exploded view of a fifth exemplary configuration of the active bolster.
Figure 10B:
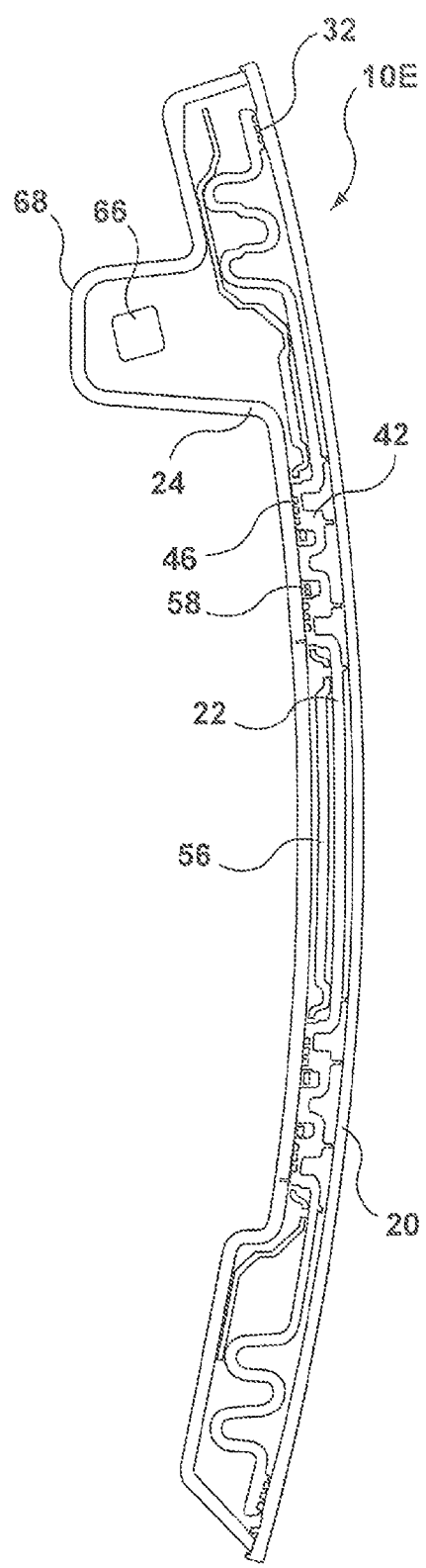

Presented in FIGS. 10a (exploded view) and 10b (cross-sectional view) is a glove-box active bolster 10E according to a fifth embodiment. As shown, active bolster 10E comprises rear panel 20, internal structure 22, front panel 24, a pair of reinforcement plates 56 and inflation device 26. Internal structure 22 is welded to rear panel 20 at weld points 32 located around the perimeters of internal structure 22 and rear panel 20 to form the inflatable hollow chamber. Front panel 24 is welded to internal structure 22 via weld protrusions 42 on internal structure 22, and weld pads 46 provided on front panel 24. By virtue of anchor feature 58, and the cooperation of anchor feature 58 with weld protrusion 42 and weld pad 46, reinforcement plate 56 is securely captured between front panel 24 and internal structure 22. For the purpose of opening/closing the glove box door, active bolster 10E is designed to operably rotate about hinge 14, which is integrally formed on front panel 24, and by way of pins (not shown) rotatably attaches to instrument panel IP. For locking glove-box active bolster 10E in the closed position, a latch mechanism 66 is provided in latch housing 68 of front panel 24. Latch mechanism 66 cooperates with a latch aperture (not shown) provided on instrument panel IP, as generally known in the art. In this configuration, the load path during deployment is primarily through front panel 24, and in particular through hinge 14 and latch mechanism 66 situated in latch housing 68.

Assembly F

Figure 11A:
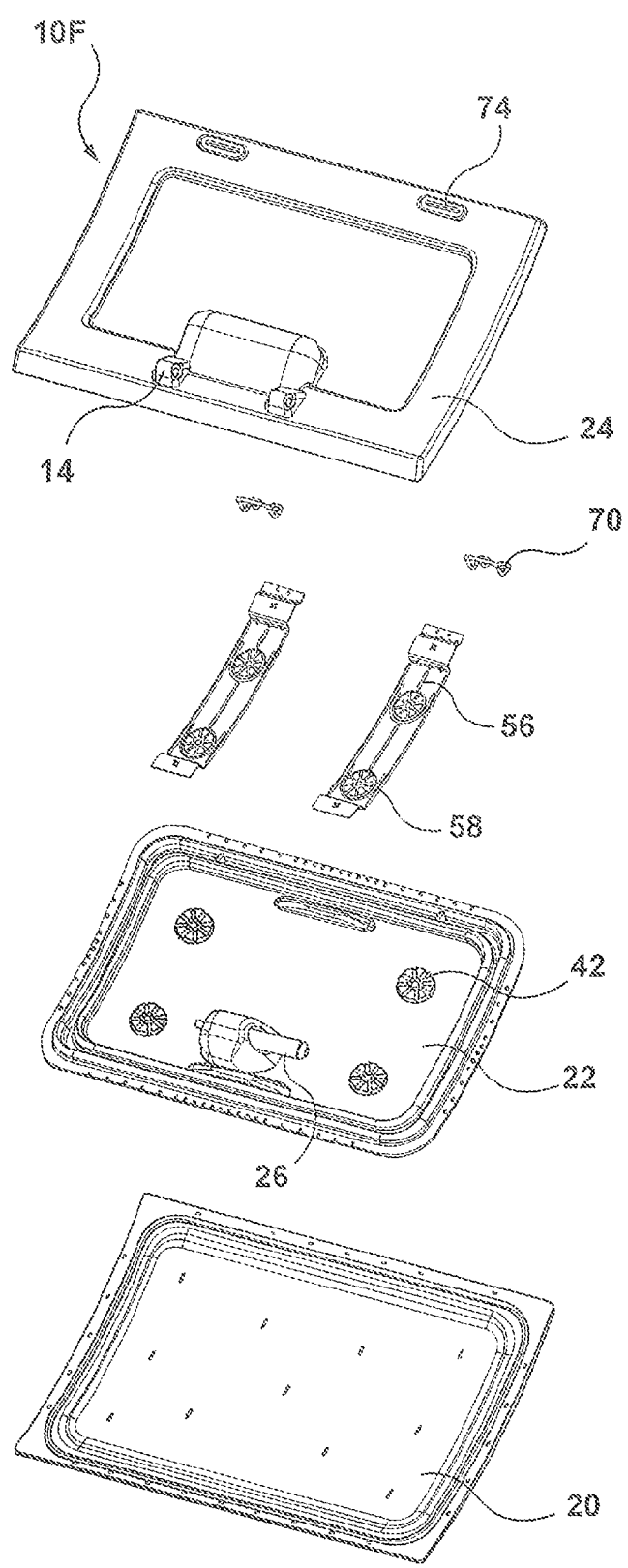
FIG. 11a is a perspective exploded view of a sixth exemplary configuration of the active bolster.
Figure 11B:
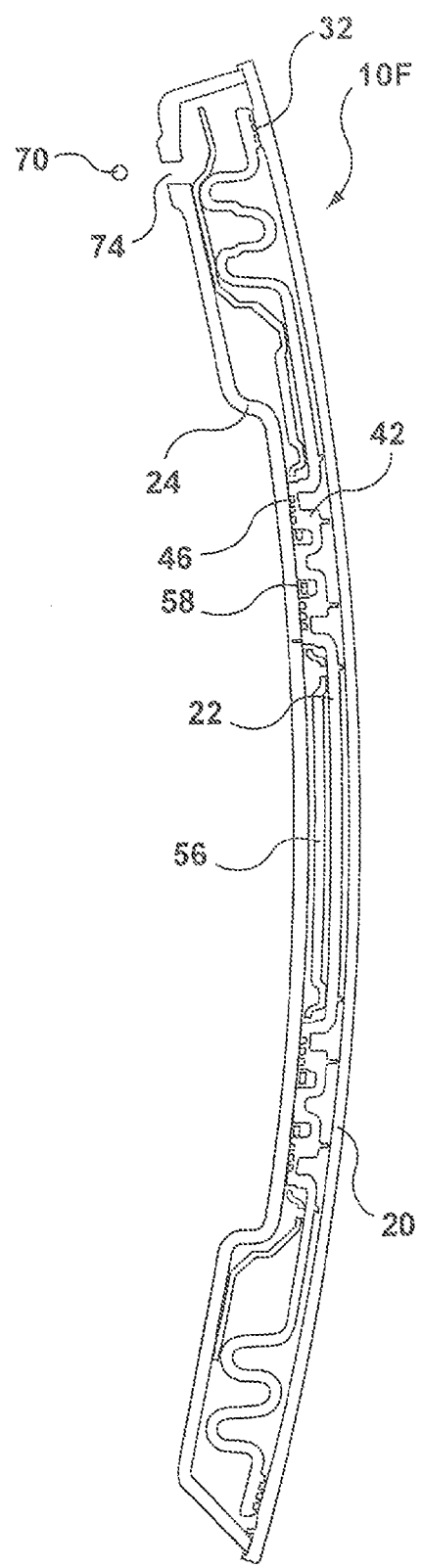

Presented in FIGS. 11a (exploded view) and 11b (cross-sectional view) is a glove-box active bolster 10F according to a sixth embodiment. As shown, active bolster 10F comprises rear panel 20, internal structure 22, front panel 24, a pair of reinforcement plates 56 and inflation device 26. Internal structure 22 is welded to rear panel 20 at weld points 32 located around the perimeters of internal structure 22 and rear panel 20 to form the inflatable hollow chamber. Front panel 24 is welded to internal structure 22 via weld protrusions 42 on internal structure 22, and weld pads 46 provided on front panel 24. By virtue of anchor feature 58, and the cooperation of anchor feature 58 with weld protrusion 42 and weld pad 46, reinforcement plate 56 is securely captured between front panel 24 and internal structure 22. For the purpose of opening/closing the glove box door, active bolster 10F is designed to operably rotate about hinge 14, which is integrally formed on front panel 24, and by way of pins (not shown) rotatably attaches to instrument panel IP. For locking glove-box active bolster 10F in the closed position, a pair of strikers 70 are provided which cooperate with a latch mechanism (not shown) provided on instrument panel IP. Strikers 70 are configured with a shape that anchors them relative to front panel 24. For example, as previously shown in FIG. 8c, strikers 70 may be mounted on posts 72 provided on the inside surface 44 of front panel 24. Strikers 70 pass through opening 74 to be exposed outside front panel 24, allowing for engagement with the latching mechanism in instrument panel IP. In this configuration, the load path during deployment is primarily through front panel 24, and in particular through hinge 14 and strikers 70.

Assembly G

Figure 12C:
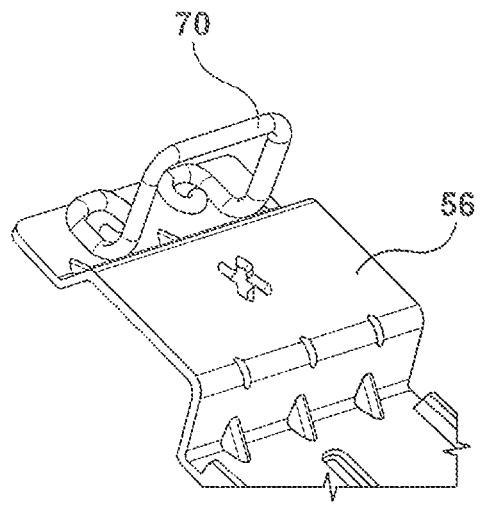
FIG. 12c is an enlarged perspective view showing the mounting of the striker on the reinforcement plate.
Figure 12D:
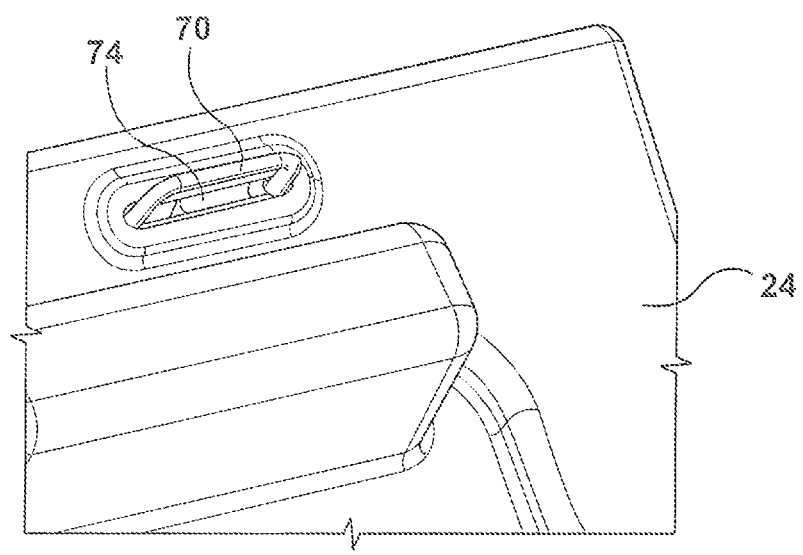
FIG. 12d is an enlarged perspective view of the front side of the front panel, showing the striker exposed for latching to a latching mechanism.

Presented in FIGS. 12a (exploded view) and 12b (cross-sectional view) is a glove-box active bolster 10G according to a seventh embodiment. As shown, active bolster 10G comprises rear panel 20, internal structure 22, front panel 24, a pair of reinforcement plates 56 and inflation device 26. Internal structure 22 is welded to rear panel 20 at weld points 32 located around the perimeters of internal structure 22 and rear panel 20 to form the inflatable hollow chamber. Front panel 24 is welded to internal structure 22 via weld protrusions 42 on internal structure 22, and weld pads 46 provided on front panel 24. By virtue of anchor feature 58, and the cooperation of anchor feature 58 with weld protrusion 42 and weld pad 46, reinforcement plate 56 is securely captured between front panel 24 and internal structure 22. For the purpose of opening/closing the glove box door, active bolster 10G is designed to operably rotate about hinge extension 76 provided on reinforcement plate 56 Hinge extension 76 extends through opening 78 provided on front panel 24, and by way of pins (not shown) rotatably attaches active bolster 10G to instrument panel IP. For locking glove-box active bolster 10G in the closed position, a pair of strikers 70 are provided which cooperate with a latch mechanism (not shown) provided on instrument panel IP. Strikers 70 are configured to be anchored on reinforcement plate 56 as shown in FIG. 12c (e.g. by metallurgic bonding, or physical capture), and pass through opening 74 to be exposed outside front panel 24 as shown in FIG. 12d, allowing for engagement with the latching mechanism in instrument panel IP. In this configuration, the load path during deployment is primarily through reinforcement plate 56, in particular through hinge extension 76 and strikers 70.

Assembly H

Presented in FIGS. 13a (exploded view) and 13b (cross-sectional view) is a glove-box active bolster 10H according to an eighth embodiment. As shown, active bolster 10H comprises rear panel 20, internal structure 22, front panel 24, a pair of reinforcement plates 56 and inflation device 26. Internal structure 22 is welded to rear panel 20 at weld points 32 located around the perimeters of internal structure 22 and rear panel 20 to form the inflatable hollow chamber. In a departure from the previous embodiments, reinforcement plate 56 in the present embodiment is fixedly captured solely by the welded cooperation of anchor feature 58 with weld protrusion 42 provided on internal structure 22. In addition, front panel 24 is fixed to the remaining components of active bolster 10H by way of a frangible weld 80 around the periphery of rear panel 20, and additionally by permanently engaging reinforcement plate 56 by way of tabs 82 provided on inside surface 44 of front panel 24. Tabs 82 are received in corresponding apertures 84 on reinforcement plate 56. Frangible weld 80 is designed to break on deployment of active bolster 10H, allowing rear panel 20 to displace towards the occupant. For the purpose of opening/closing the glove box door, active bolster 10H is designed to operably rotate about hinge extension 76 provided on reinforcement plate 56. Hinge extension 76 extends through opening 78 provided on front panel 24, and by way of pins (not shown) rotatably attaches active bolster 10H to instrument panel IP. For locking glove-box active bolster 10H in the closed position, a pair of strikers 70 are provided which cooperate with a latch mechanism (not shown) provided on instrument panel IP. As detailed with respect to FIGS. 12c and 12d, strikers 70 are configured to be anchored on reinforcement plate 56 (e.g. by metallurgic bonding, or physical capture), and pass through opening 74 to be exposed outside front panel 24, allowing for engagement with the latching mechanism in instrument panel IP. In this configuration, the load path during deployment is primarily through reinforcement plate 56, in particular through hinge extension 78 and strikers 70.

Assembly I

Presented in FIGS. 14a (exploded view) and 14b (cross-sectional view) is a glove-box active bolster 10I according to a ninth embodiment. As shown, active bolster 10I comprises rear panel 20, internal structure 22, front panel 24, a pair of reinforcement plates 56 and inflation device 26. Internal structure 22 is welded to rear panel 20 at weld points 32 located around the perimeters of internal structure 22 and rear panel 20 to form the inflatable hollow chamber. In another departure from the previous embodiments, reinforcement plate 56 in the present embodiment is fixedly captured solely by the mechanical fastening of anchor feature 58 with weld protrusion 42 provided on internal structure 22. As shown, the mechanical fastening is achieved by way of one or more rivets 86, but as will be appreciated, other mechanical fastening means are possible including, but not limited to threaded fasteners. In addition, front panel 24 is fixed to the remaining components of active bolster 10I by way of a frangible weld 80 around the periphery of rear panel 20, and additionally by permanently engaging reinforcement plate 56 by way of tabs 82 provided on inside surface 44 of front panel 24. Tabs 82 are received in corresponding apertures 84 on reinforcement plate 56. Frangible weld 80 is designed to break on deployment of active bolster 10I, allowing rear panel 20 to displace towards the occupant. For the purpose of opening/closing the glove box door, active bolster 10I is designed to operably rotate about hinge extension 76 provided on reinforcement plate 56. Hinge extension 76 extends through opening 78 provided on front panel 24, and by way of pins (not shown) rotatably attaches active bolster 10I to instrument panel IP. For locking glove-box active bolster 10I in the closed position, a pair of strikers 70 are provided which cooperate with a latch mechanism (not shown) provided on instrument panel IP. As detailed with respect to FIGS. 12c and 12d, strikers 70 are configured to be anchored on reinforcement plate 56 (e.g. by metallurgic bonding, or physical capture), and pass through opening 74 to be exposed outside front panel 24, allowing for engagement with the latching mechanism in instrument panel IP. In this configuration, the load path during deployment is primarily through reinforcement plate 56, in particular through hinge extension 76 and strikers 70.

Assembly J

Figure 15A:
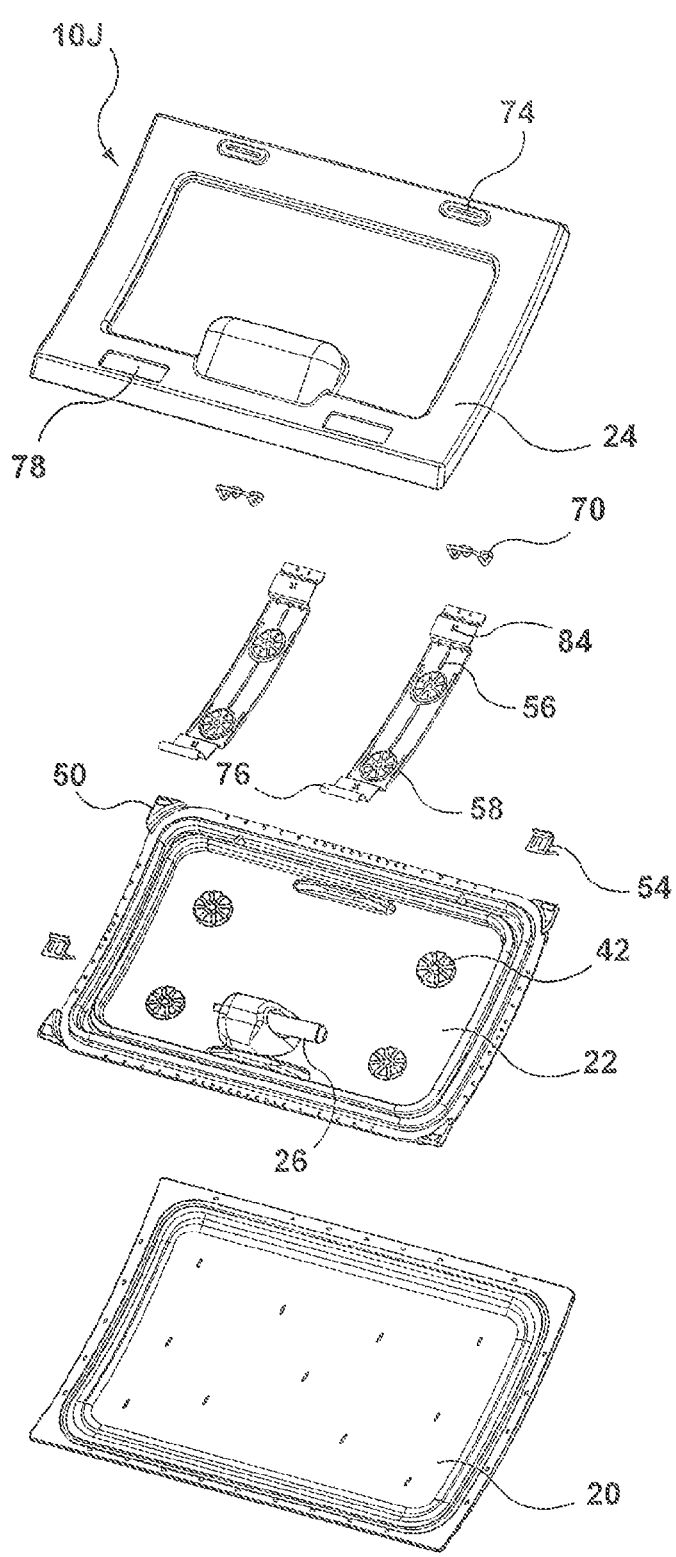
FIG. 15a is a perspective exploded view of a tenth exemplary configuration of the active bolster.
Figure 15B:
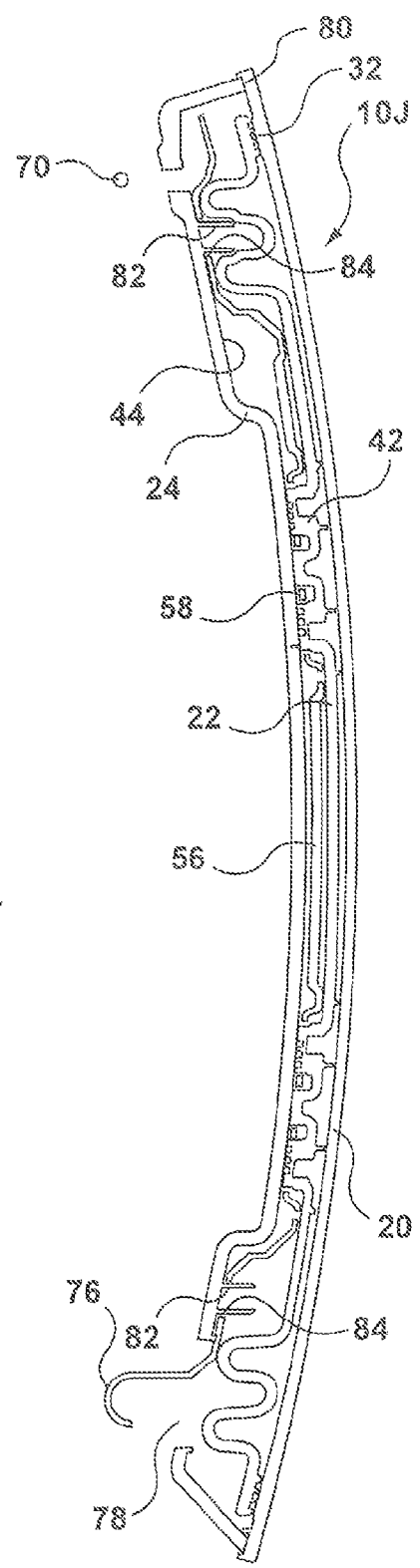

Presented in FIGS. 15a (exploded view) and 15b (cross-sectional view) is a glove-box active bolster 10J according to a tenth embodiment. As shown, active bolster 10J comprises rear panel 20, internal structure 22, front panel 24, a pair of reinforcement plates 56 and inflation device 26. Internal structure 22 is welded to rear panel 20 at weld points 32 located around the perimeters of internal structure 22 and rear panel 20 to form the inflatable hollow chamber. In a departure from the previous embodiments, reinforcement plate 56 in the present embodiment is fixedly captured solely by the welded cooperation of anchor feature 58 with weld protrusion 42 provided on internal structure 22. In addition, front panel 24 is fixed to the remaining components of active bolster 10J by way of tab or clip-type fastener 52 (e.g. clip towers; see FIG. 4) provided on inside surface 44 of front panel 24, tab or clip-type fastener 52 being received in corresponding receptacles 50 provided on internal structure 22. The tab or clip-type fastener 52 may further use a spring clip 54 to ensure secure connection between internal structure 22 and rear panel 24. In addition, front panel 24 is fixed to the remaining components of active bolster 10J by engaging reinforcement plate 56 by way of tabs 82 provided on inside surface 44 of front panel 24. Tabs 82 are received in corresponding apertures 84 on reinforcement plate 56. As no welding is used to fix front panel 24 relative to the remaining components, it is possible to detach front panel 24 for servicing of internal components (e.g. inflation device 26) through disengagement of tab or clip-type fasteners 52, and tabs 82 provided on front panel 24. For the purpose of opening/closing the glove box door, active bolster 10J is designed to operably rotate about hinge extension 76 provided on reinforcement plate 56. Hinge extension 76 extends through opening 78 provided on front panel 24, and by way of pins (not shown) rotatably attaches active bolster 10J to instrument panel IP. For locking glove-box active bolster 10J in the closed position, a pair of strikers 70 are provided which cooperate with a latch mechanism (not shown) provided on instrument panel IP. As detailed with respect to FIGS. 12c and 12d, strikers 70 are configured to be anchored on reinforcement plate 56 (e.g. by metallurgic bonding, or physical capture), and pass through opening 74 to be exposed outside front panel 24, allowing for engagement with the latching mechanism in instrument panel IP. In this configuration, the load path during deployment is primarily through reinforcement plate 56, in particular through hinge extension 76 and strikers 70.

Assembly K

Figure 16A:
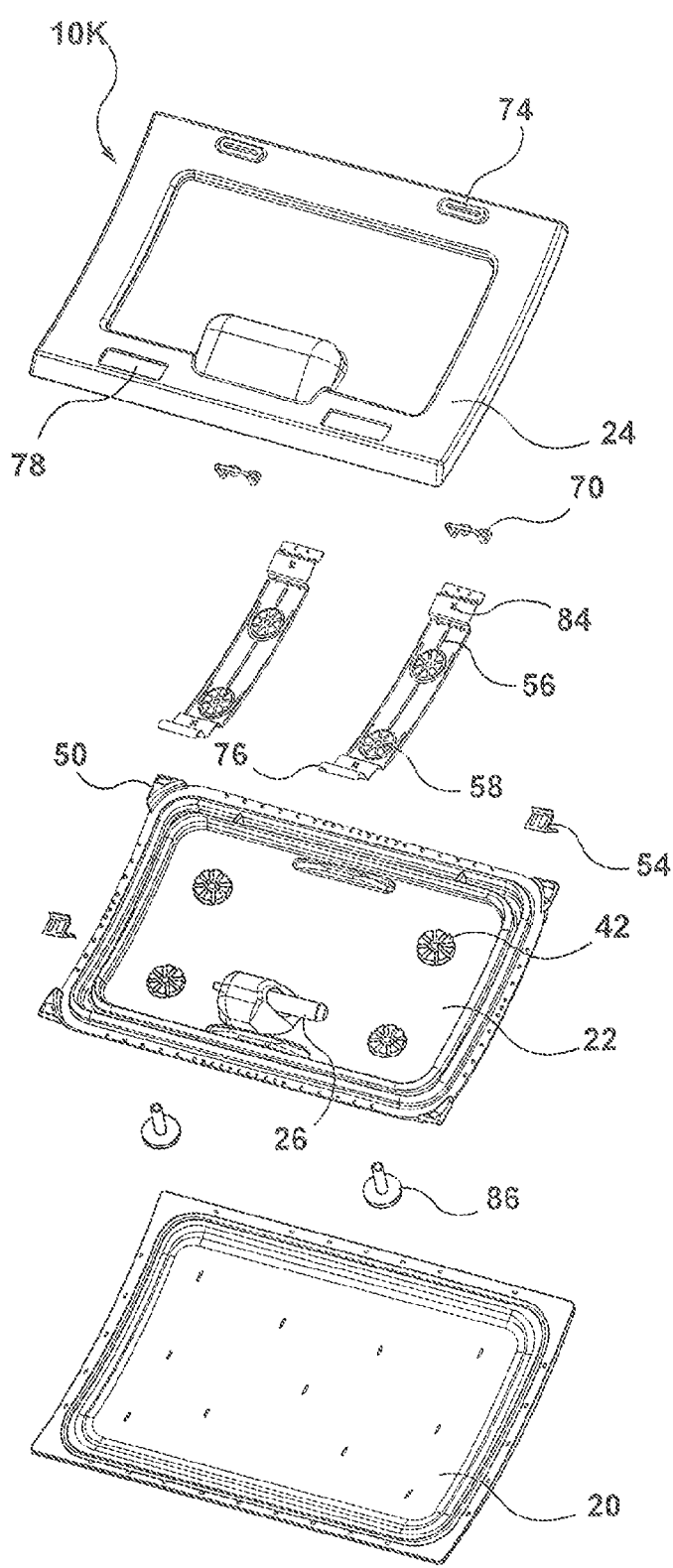
FIG. 16a is a perspective exploded view of an eleventh exemplary configuration of the active bolster.
Figure 16B:
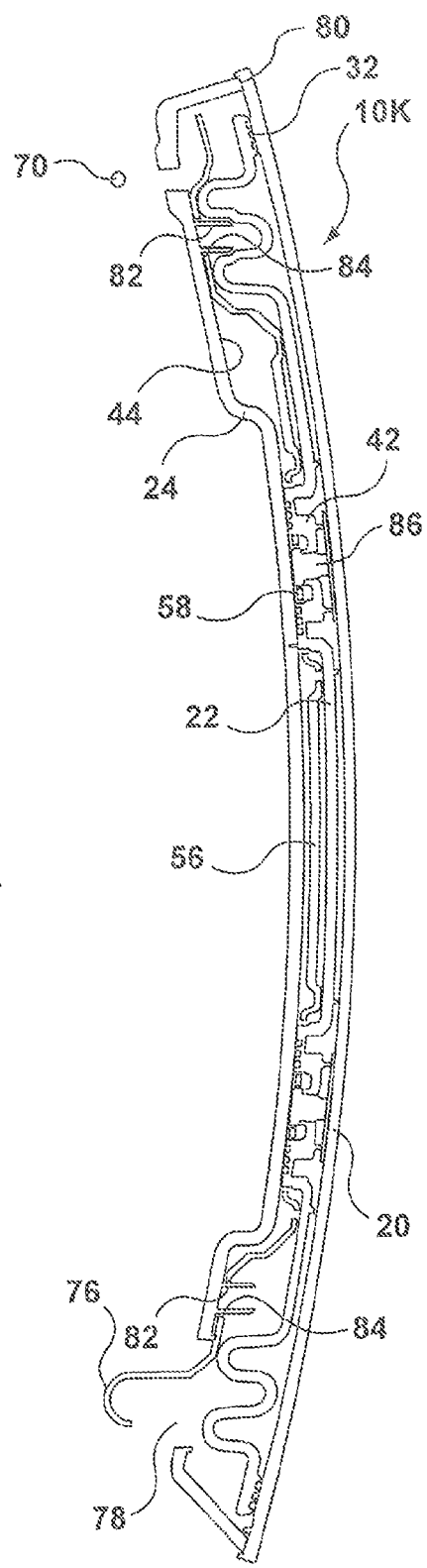

Presented in FIGS. 16a (exploded view) and 16b (cross-sectional view) is a glove-box active bolster 10K according to an eleventh embodiment. As shown, active bolster 10K comprises rear panel 20, internal structure 22, front panel 24, a pair of reinforcement plates 56 and inflation device 26. Internal structure 22 is welded to rear panel 20 at weld points 32 located around the perimeters of internal structure 22 and rear panel 20 to form the inflatable hollow chamber. In another departure from the previous embodiments, reinforcement plate 56 in the present embodiment is fixedly captured solely by the mechanical fastening of anchor feature 58 with weld protrusion 42 provided on internal structure 22. As shown, the mechanical fastening is achieved by way of one or more rivets 86, but as will be appreciated, other mechanical fastening means are possible including, but not limited to threaded fasteners. In addition, front panel 24 is fixed to the remaining components of active bolster 10K by way of tab or clip-type fastener 52 (e.g. clip towers; see FIG. 4) provided on inside surface 44 of front panel 24, tab or clip-type fastener 52 being received in corresponding receptacles 50 provided on internal structure 22. The tab or clip-type fastener 52 may further use a spring clip 54 to ensure secure connection between internal structure 22 and rear panel 24. In addition, front panel 24 is fixed to the remaining components of active bolster 10K by engaging reinforcement plate 56 by way of tabs 82 provided on inside surface 44 of front panel 24. Tabs 82 are received in corresponding apertures 84 on reinforcement plate 56. As no welding is used to fix front panel 24 relative to the remaining components, it is possible to detach front panel 24 for servicing of internal components (e.g. inflation device 26) through disengagement of tab or clip-type fasteners 52, and tabs 82 provided on front panel 24. For the purpose of opening/closing the glove box door, active bolster 10K is designed to operably rotate about hinge extension 76 provided on reinforcement plate 56. Hinge extension 76 extends through opening 78 provided on front panel 24, and by way of pins (not shown) rotatably attaches active bolster 10K to instrument panel IP. For locking glove-box active bolster 10K in the closed position, a pair of strikers 70 are provided which cooperate with a latch mechanism (not shown) provided on instrument panel IP. As detailed with respect to FIGS. 12c and 12d, strikers 70 are configured to be anchored on reinforcement plate 56 (e.g. by metallurgic bonding, or physical capture), and pass through opening 74 to be exposed outside front panel 24, allowing for engagement with the latching mechanism in instrument panel IP. In this configuration, the load path during deployment is primarily through reinforcement plate 56, in particular through hinge extension 76 and strikers 70.

Assembly L

Figure 17A:
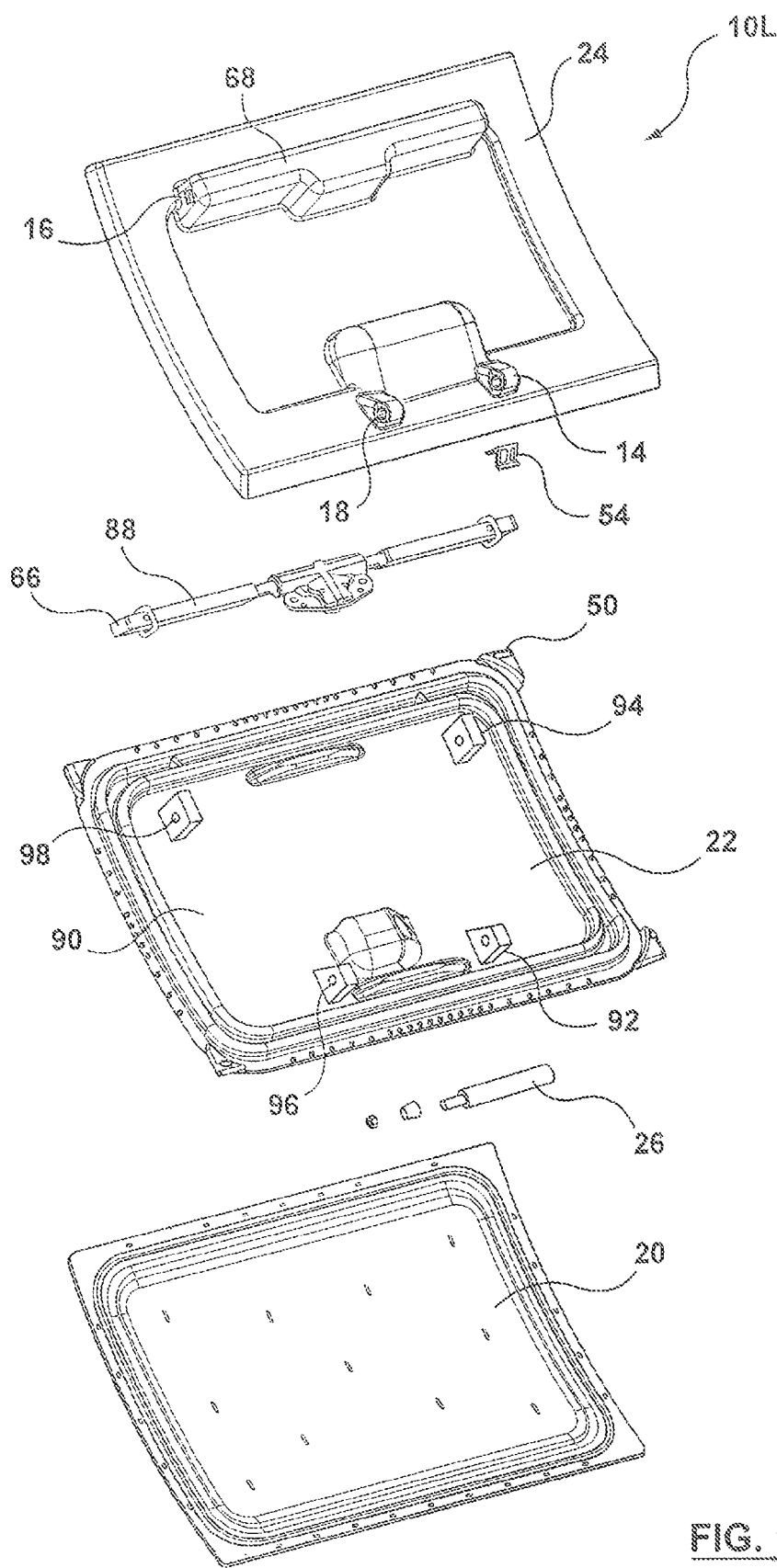
FIG. 17a is a perspective exploded view of a twelfth exemplary configuration of the active bolster.
Figure 17B:
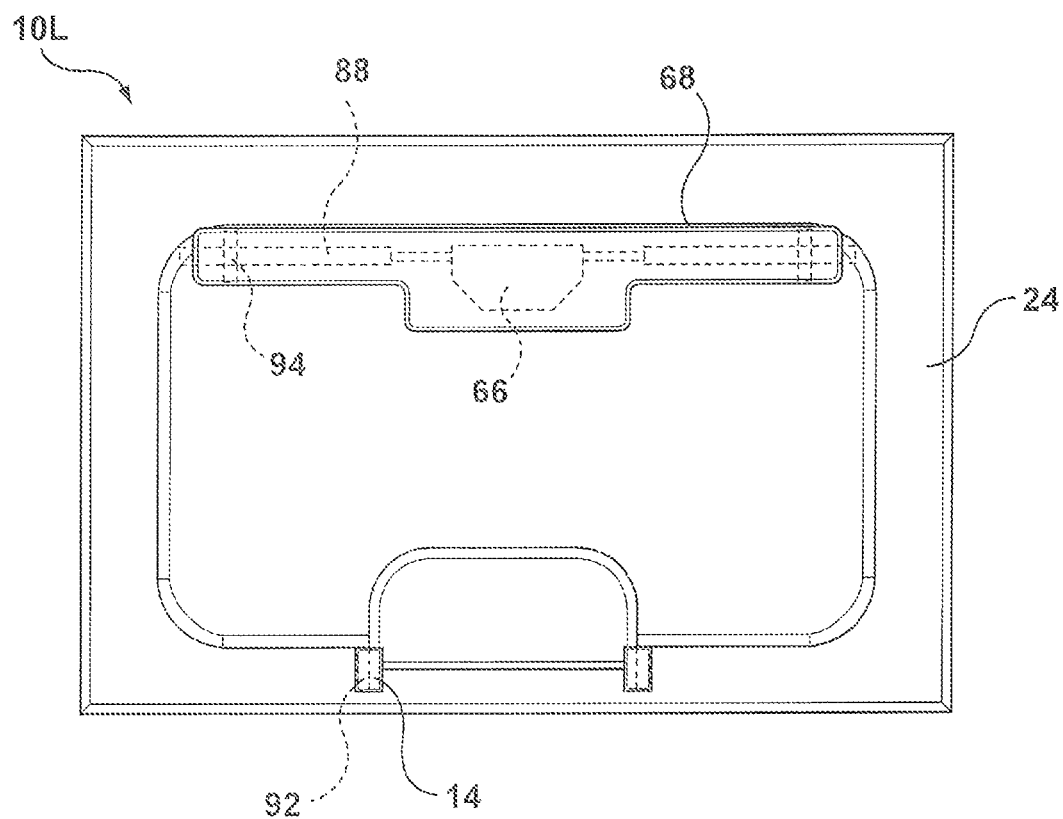

While the front panel may be irremovably/permanently coupled to the internal structure as detailed above, in another embodiment, the front panel is removably coupled to the internal structure so as to provide access to the inflation device for other internal components for servicing. As seen in FIGS. 17*a* and 17*b*, provided is an active bolster 10L comprising rear panel 20, internal structure 22, front panel 24, and inflation device 26. Also provided is a latch mechanism 66 positioned within latch housing 68, latch mechanism 66 having one or more lock bars 88 that extend through latch housing 68 to engage a receiving latch aperture provided in instrument panel IP. Situated on front surface 90 of internal structure 22 are one or more lower support tabs 92 and one or more upper support tabs 94. Lower and upper support tabs 92, 94 include apertures 96, 98, respectively. Front panel 24 is configured to receive lower and upper support tabs 92, 94 of internal structure 22. In the exemplary embodiment shown, lower support tab 92 is received in integral hinge 14, with lower aperture 96 of lower support tab 92 aligning with hinge aperture 18 of hinge 14. Lower apertures 96 and hinge aperture 18 are round holes, configured to receive and rotate about a round fastener, such as a pin or dowel. Instrument panel IP provides corresponding and aligning attachment points (not shown), such as round apertures, configured to receive the round fasteners. Arranged in this manner, the fasteners extend through portions of internal structure 22, front panel 24, and instrument panel IP, so as to couple internal structure 22 to front panel 24, thereby coupling active bolster 10 to instrument panel IP and forming an axis of rotation for active bolster 10 to function as a glove box door. According to other embodiments, the integral hinge may be formed in other manners allowing relative rotation of the active bolster relative to the instrument panel, which include, but are not limited to, using fasteners having different and varying cross-sections (e.g., threads to engage the instrument panel with circular cross-section to engage the active bolster, or circular cross-section to engage and rotate relative the glove box with polygonal cross-section to engage the active bolster) and different shaped apertures (e.g., different shapes corresponding to different fasteners). In another embodiment, another type of hinge is provided to rotatingly couple the active bolster to the instrument panel, where lower aperture 96 of internal structure 22 aligns with an aperture in a separate support tab receiving structure of front panel 24.

Latch mechanism 66, disposed within latch housing 68, is provided to enable repeated coupling and detachment of active bolster 10 to the instrument panel (i.e., opening and closing the glove box). In the exemplary embodiment presented here, latch mechanism 66 is also used to removably couple internal structure 22 to front panel 24. In general, latch mechanism 66 includes a gear, a return spring and one or more pins or lock bars 88. The gear of latch mechanism 66 is rotatingly coupled to latch housing 68, and by way of corresponding and engaging teeth on the gear and lock bars 88, rotation of the gear results in translational movement of lock bars 88. In the arrangement shown, lock bars 88 extend through aperture 16 provided in latch housing 68. As such, upon sufficient retraction of lock bars 88 from aperture 16, lock bars 88 disengage from instrument panel IP, allowing the glove box to rotate about hinge 14.

As detailed above, lower support tab 92 is received in integral hinge 14, with lower aperture 96 of lower support tab 92 aligning with hinge aperture 18 of hinge 14. Similarly, latch housing 68 is configured to receive upper support tabs 94 of internal structure 22. Upper support tabs 94 extend into latch housing 68, and apertures 98 of support tabs 94 align with and receive lock bars 88 of latch mechanism 66. Apertures 98 of support tabs 94 and apertures 16 of latch housing are shaped to correspond with lock bars 88, for example, each may have a square, circular, semi-circular, or other shape. Lock bars 88 extend through apertures 98 so as to couple internal structure 22 to front panel 24. Support tabs 94 are disposed sufficiently inward of latch housing 68, such that during normal operation of latch mechanism 66 (e.g., opening and closing the glove box), lock bars 88 will not retract entirely through apertures 98 of interior structure 22. Lock bars 88, however, may be pushed in further, such as through the use of a tool, to retract lock bars 88 entirely through apertures 98 of interior structure 22 so as to decouple interior structure 22 from front panel 24.

In the embodiment shown in FIG. 17*a*, active bolster 10L includes the use of tabs or clip-type fasteners to assist in the fit and finish of active bolster 10L in instrument panel IP, similar that that detailed above having regard to FIG. 4. As such, internal structure 22 is provided with tab receptacles 50 at each corner, each receptacle 50 being configured to receive a tab or clip-type fastener (not visible) provided on the inside surface of rear panel 24. The tab or clip-type fastener 52 may further use a spring clip 54 to ensure secure connection between internal structure 22 and front panel 24. To permit operable expansion of hollow chamber 30 during deployment of active bolster 10, the tab or clip-type fasteners are configured as frangible attachments.

Figure 2D:
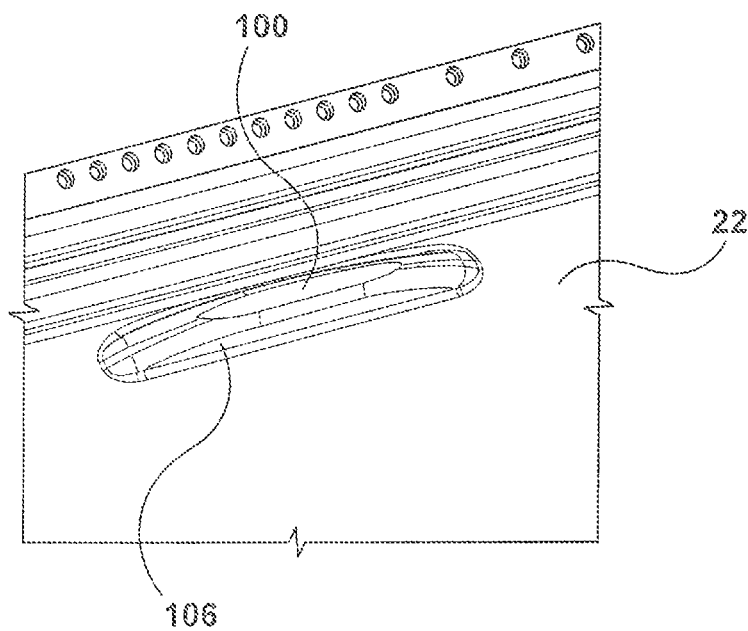
FIG. 2d is an expanded perspective view of the internal structure of the active bolster of FIG. 2a, detailing a vent.
Figure 18:
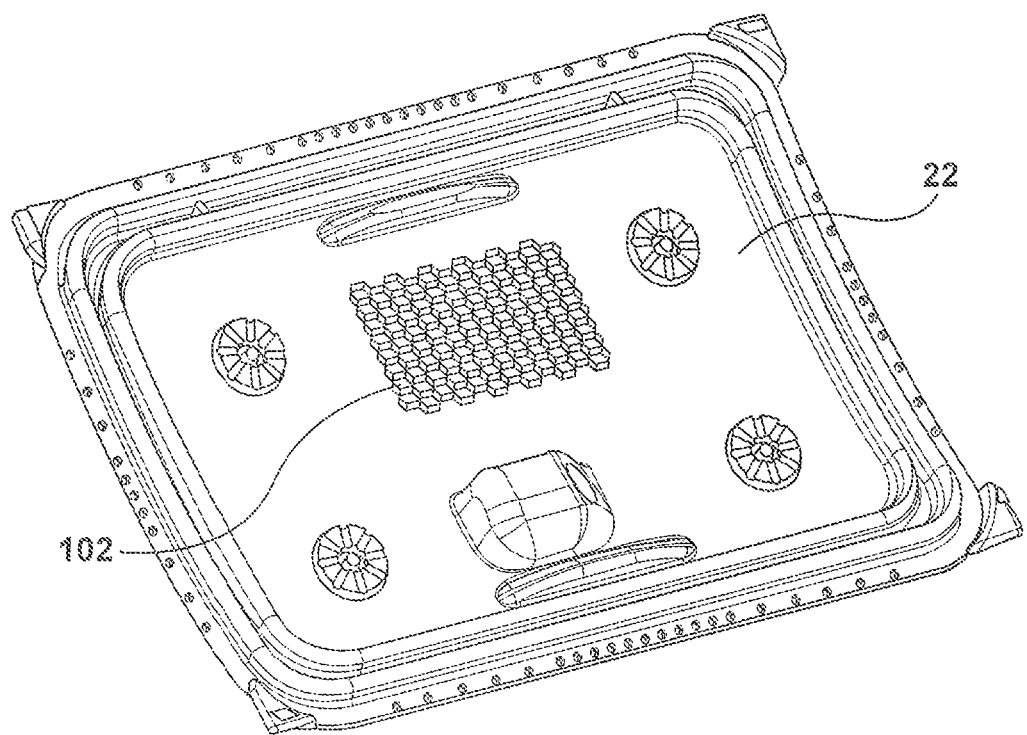
FIG. 18 is a perspective view of an internal structure showing the incorporation of polygonal features (e.g. raised honeycomb) to increase stiffness/rigidity.

The active bolster described herein is configured to expand in a controlled manner. In the various embodiments shown, internal structure 22 includes a pair of vents 100 (see FIG. 2*b* and enlarged view of FIG. 2*d*) to release the inflator gas from the hollow chamber during and immediately following discharge of the inflation device. Vents 100 may be incorporated to control, for example, the rate and extent of expansion of the hollow chamber and movement of rear panel 20. As will be appreciated, vents 100 may be provided in a wide range of configurations. As shown, vents 100 are provided in the form of a slit that generally maintains a constrictive opening to promote expansion of hollow chamber 30. On expansion, vent 100 assumes a more elliptical or circular opening, facilitating the exhaust of gasses, and thus energy absorption during impact by the occupant. In addition, vents 100 as shown are provided on raised rib-like structures 106. Rib-like structures 106 serve to provide added flexibility to active bolster 10, such that on deployment, the portion extending to face and engage the occupant remains largely rectangular. Rib-like structures such as those detailed here may be incorporated in other areas of active bolster 10 to promote localized flexibility, so as to achieve a determinable deployment shape. It will be appreciated that while vents 100 are shown as being positioned on rib-like structures 106, these features may be provided as separate elements on active bolster 10 In other exemplary embodiments, active bolster characteristics may be controlled using vents or, for example, by the design and selection of materials (i.e., types, combinations, thickness, or amount), pleats (e.g., number, location, or shape), inflation device (e.g., type, discharge rate, or discharge amount), structural features (e.g., ribs, honeycomb patterns or tear tabs) incorporated into rear panel 20, internal structure 22, or front panel 24, or any combination thereof. For example, as seen in FIG. 18, interior structure 22 may include integral features such as a geometric pattern 102 (e.g. honeycomb or hexagonal pattern) for improved structural characteristics.

Figure 19:
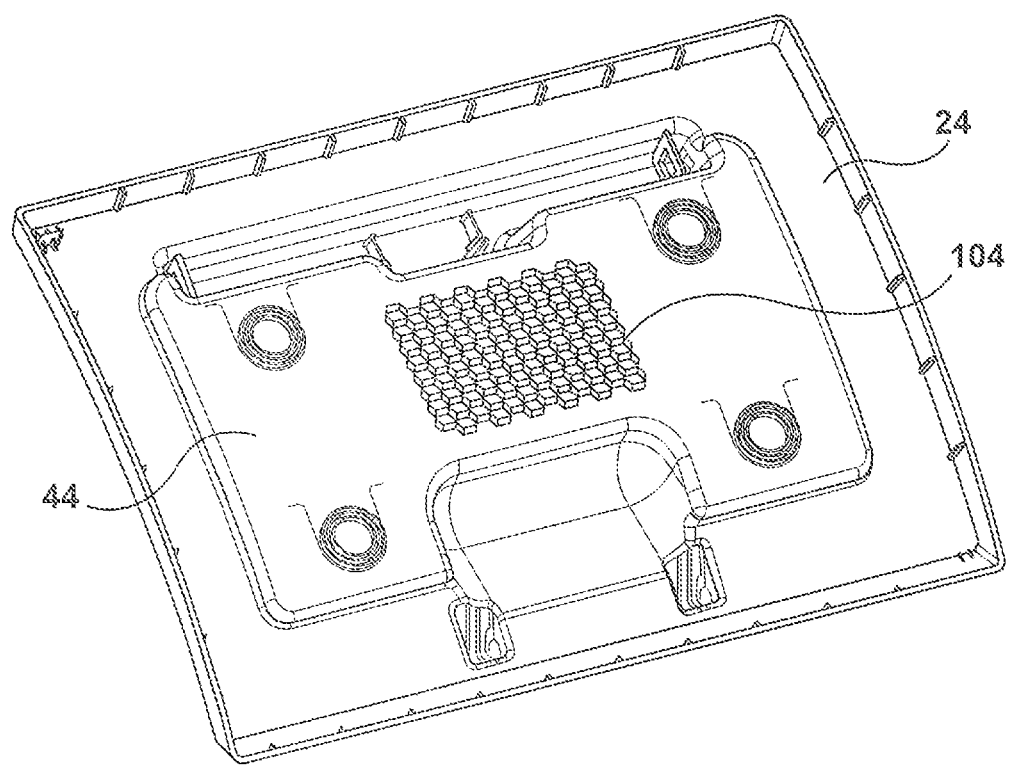
FIG. 19 is a perspective view of the internal surface of the front panel, showing the incorporation of polygonal features (e.g. raised honeycomb) to increase stiffness/rigidity.

Further, front panel 24 may be configured to transfer or absorb energy, without significantly deforming, from a moving object impacting active bolster 10 before or after activation. As seen in FIG. 19, this may be accomplished by incorporating a geometric pattern 104 (e.g. honeycomb or hexagonal pattern, triangular pattern, etc . . . ) onto inside surface 44 of front panel 24, or, for example, through choice of materials (e.g., thermoplastic, metal, or composite), incorporation of integral structural features (e.g., honeycomb pattern or ribs), the use of multiple pieces to form front panel 24 (e.g., splines, ribs, inserts, or backing of any material attached to front panel 24), or any combination thereof.

In the various embodiments presented above, the engagement between rear panel 20 and internal structure 22 may additionally comprise tack-offs, which are localized frangible attachment points that promote rigidity in active bolster 10, and reduce the hollow sound of hollow chamber 30. Tack-offs may take on a variety of forms, with two such examples provided in FIGS. 20*a* and 20*b*. In one arrangement, rear panel 20 provides a plurality of raised segments 108 situated in a first orientation. On the mating inside surface of internal structure 22, provided are a plurality of corresponding raised segments 110 (shown in dot), situated generally perpendicular or at least in intersecting relationship with raised segments of rear panel 20. On welding rear panel 20 to internal structure 22, the intersecting raised segments are also welded, creating localized fangible attachments between these structures. Other configurations for the tack-offs are possible, such as an intersected circular arrangement. As such, a circular raised segment 112 is provided on one surface, and an 'X' shaped raised segment 114 (shown in dot) provided on the mating surface, where the 'X' raised surface coincides with the circular raised surface, forming 4 frangible attachment points on welding.

Figure 8D:
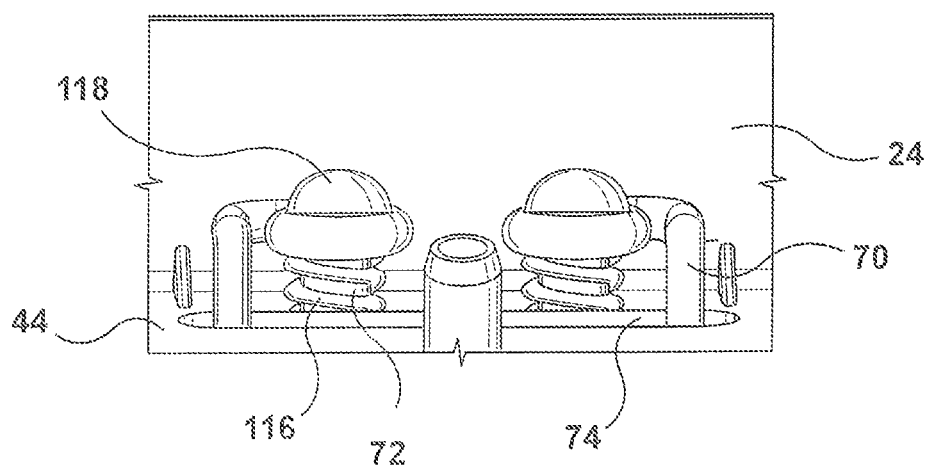
FIG. 8d is a enlarged perspective view of an alternate mounting arrangement of the striker on the front panel.

In the various embodiments presented above pertaining to the use of strikers 70, strikers are shown as mounted on posts 72 provided on the inside surface 44 of front panel 24. In some embodiments, for example as shown in FIG. 8*d*, the connection of strikers 70 to front panel 24 may incorporate the use of one or more springs 116 positioned between inside surface 44 of front panel 24, and a head 118 formed on post 72. As detailed earlier, striker 70 passes through opening 74 to be exposed to the outside of front panel 24. As such, springs 116 serve to absorb energy, and therefore decrease the load on front panel 24 during active bolster deployment. It will also be appreciated that while a pair of strikers are generally shown, other embodiments may incorporate a single striker, or a plurality of strikers.

Figure 21A:
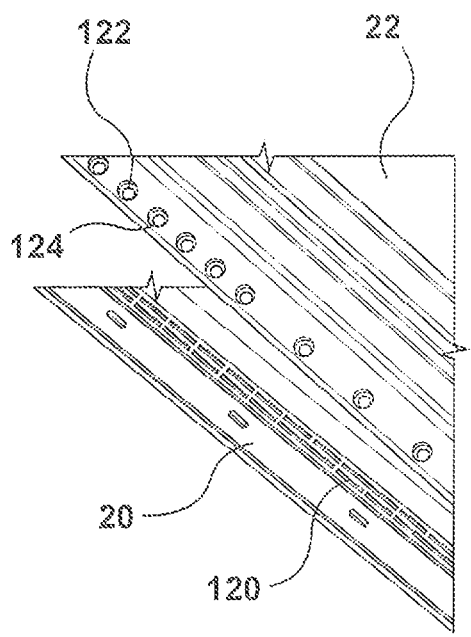
FIGS. 21a and 21b are partial perspective views of the real panel and internal structure, detailing the weld provided therebetween.
Figure 21B:
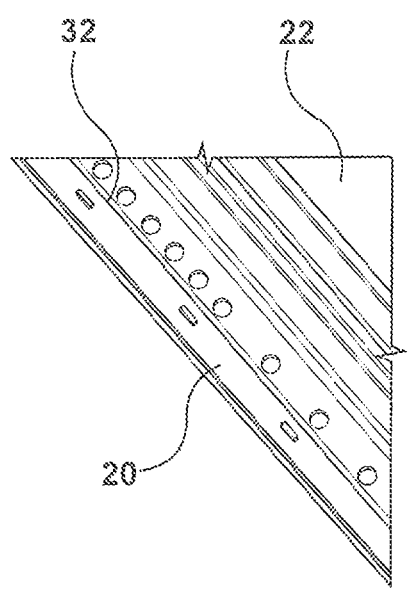

While a variety of methodologies may be implemented to achieve weld point 32 between rear panel 20 to interior structure 22, in some embodiments, for example as shown in FIGS. 21*a* and 21*b*, weld point 32 is formed through the cooperative welded engagement between weld structure 120 provided on rear panel 20, and weld apertures 122 provided on internal structure 22. Weld apertures 122 are provided with recesses or wells 124 that permit the ingress of melt from weld structures 120 during the weld process. As such, in addition to the surface bonding that occurs between rear panel 20 and interior structure 22 along weld point 32, rear panel 20 is locked relative to interior structure 22.

According to exemplary embodiments, the materials and manufacturing methods used may be chosen according to desired appearance and structural characteristics, such as stiffness or rigidity, for each of rear panel 20, internal structure 22, and front panel 24. According to one exemplary embodiment, rear panel 20, internal structure 22, and front panel 24 are made from injection molded TPO resin. Internal structure 22 is made from a formulation less stiff than rear panel 20 or front panel 24, thus allowing pleats 28 to fully expand upon activation of the inflation device. Front panel 24 is sufficiently rigid and stiff to provide a reaction surface from which rear panel 20 may extend upon inflation of hollow chamber 30 and withstand impacts into active bolster 10. Additionally, rear panel 20, internal structure 22, and front panel 24 may include organic or inorganic reinforcement materials or structures to impart desired structural characteristics. Further, rear panel 20 and front panel 24 may include aesthetic surface design characteristics, such as graining, gloss, rigidity, or surface coverings, such as vinyl, cloth or leather. In other exemplary embodiments, other injection molded thermoplastics are used, such as polyethylene, polypropylene, ABS, ABS/PC, PLA, PBT, TPE, or TPEEE. In still other exemplary embodiments, other rigid formed materials are used and formed by other methods, such as compression molding, thermoforming, blow molding, or stamping.

Those skilled in the art will recognize that the features disclosed in the embodiments described above may also be incorporated with different configurations. For example, one or more active bolsters may be used as part of a larger energy management system and be disposed in locations other than a glove box door, such as an interior panel, external panel, or seat back.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the features in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

The invention claimed is:

1. An active bolster for a vehicle occupant, the active bolster comprising:
    a rear panel, an internal structure, a front panel, and a reinforcement plate;
    said internal structure being disposed between said rear panel and said front panel;
    said reinforcement plate being disposed between said front panel and said internal structure said internal structure and said rear panel together forming a hollow chamber in communication with an inflation device, said hollow chamber being expandable on activation of the inflation device;
    said internal structure having at least one expandable element such that upon pressurization of said hollow chamber by said inflation device, at least a portion of said at least one expandable element undergoes deformation to permit inflation of said hollow chamber, displacing said rear panel rearwardly to an extended position; and
    wherein said internal structure includes weld protrusions, and said front panel includes weld pads, and wherein said weld protrusions are welded to said weld pads to couple said front panel to said internal structure, and wherein at least one anchor feature provided on said reinforcement plate is captured there between.

2. The active bolster of claim 1, wherein said at least one expandable element is formed in said internal structure about at least a portion of the periphery of said internal structure.

3. The active bolster of claim 1, wherein said rear panel is welded to said internal structure around the perimeters of said internal structure and said rear panel to form said hollow chamber.

4. The active bolster of claim 1, wherein said front panel provides U-shaped weakened areas around at least one of said weld pads to decrease load exerted on the welded connection during deployment.

5. The active bolster of claim 1, wherein said front panel provides a support surface for coupling the active bolster to a vehicle.

6. The active bolster of claim 1, wherein said active bolster is provided in the form of a glove box door.

7. The active bolster of claim 6, further comprising at least one hinge.

8. The active bolster of claim 7, wherein said at least one hinge is formed in said front panel.

9. The active bolster of claim 7, wherein said at least one hinge is provided in the form of a hinge extension on said reinforcement plate.

10. The active bolster of claim 7, further comprising at least one latching aperture provided in said front panel for cooperating with a latching mechanism provided in a vehicle instrument panel.

11. The active bolster of claim 7, further comprising at least one latching striker for cooperating with a latching mechanism provided in a vehicle instrument panel.

12. The active bolster of claim 7, further comprising a latch mechanism disposed in said front panel, for cooperative engagement with a latch aperture provided in a vehicle instrument panel.

13. The active bolster of claim 1, wherein said front panel is coupled to said internal structure using a plurality of clip-type fasteners.

* * * * *